(12) United States Patent
Chang et al.

(10) Patent No.: US 9,952,652 B2
(45) Date of Patent: Apr. 24, 2018

(54) VIRTUAL REALITY SYSTEM AND METHOD FOR CONTROLLING OPERATION MODES OF VIRTUAL REALITY SYSTEM

(71) Applicant: HTC Corporation, Taoyuan (TW)

(72) Inventors: Wei-Chih Chang, Taoyuan (TW);
Mong-Yu Tseng, Taoyuan (TW);
Nai-Jui Cheng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 42 days.

(21) Appl. No.: 14/939,367

(22) Filed: Nov. 12, 2015

(65) Prior Publication Data

US 2016/0162012 A1 Jun. 9, 2016

Related U.S. Application Data

(60) Provisional application No. 62/087,593, filed on Dec. 4, 2014, provisional application No. 62/170,878, filed on Jun. 4, 2015.

(51) Int. Cl.
*G06F 1/32* (2006.01)
*G06F 3/01* (2006.01)
*G06T 19/00* (2011.01)
*H04W 4/00* (2018.01)

(52) U.S. Cl.
CPC .......... *G06F 1/3265* (2013.01); *G06F 1/3209* (2013.01); *G06F 1/3218* (2013.01); *G06F 1/3231* (2013.01); *G06F 1/3287* (2013.01); *G06F 3/011* (2013.01); *G06T 19/006* (2013.01); *H04W 4/008* (2013.01)

(58) Field of Classification Search
None
See application file for complete search history.

(56) References Cited

U.S. PATENT DOCUMENTS

| | | | |
|---|---|---|---|
| 2009/0209205 A1* | 8/2009 | Kramer | G06F 3/1454 455/41.3 |
| 2009/0262074 A1 | 10/2009 | Nasiri et al. | |
| 2011/0187640 A1 | 8/2011 | Jacobsen et al. | |
| 2011/0194029 A1 | 8/2011 | Herrmann et al. | |

FOREIGN PATENT DOCUMENTS

| CN | 102628991 A | 8/2012 |
|---|---|---|
| CN | 203759644 U | 8/2014 |

* cited by examiner

*Primary Examiner* — Duane N Taylor, Jr.
(74) *Attorney, Agent, or Firm* — Birch, Stewart, Kolasch & Birch, LLP

(57) ABSTRACT

A virtual reality system is provided. A head mounted display apparatus is coupled to a host device via a transmission cable. A multimedia module receives multimedia content via a first signal path of the transmission cable. A multi-sensing module obtains sensing information regarding the head mounted display apparatus and the user. A power management device controls the power status of the multimedia module, the multi-sensing module, and the peripheral hub according to a power voltage via a third signal path of the transmission cable. The micro control unit detects in which mode the virtual reality system is operating according to the signal status of the first and second signal paths of the transmission cable to notify the power management device to control the power status of the multimedia module, the multi-sensing module, and the peripheral hub.

32 Claims, 21 Drawing Sheets

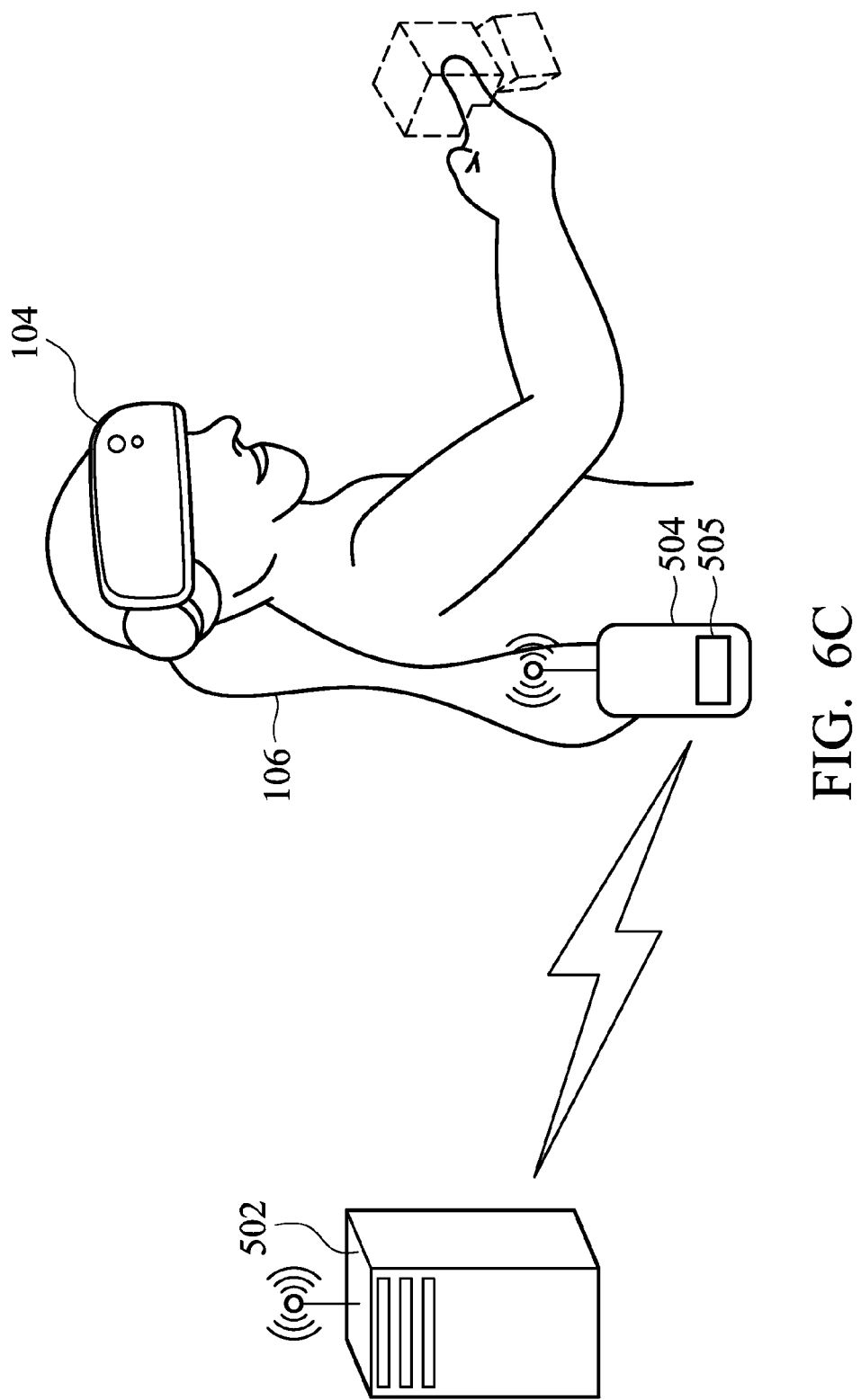

| Mode | Multimedia Bridge | Peripheral Hub | Audio Unit | Position Sensing Device | User Sensing Device |
|---|---|---|---|---|---|
| Waiting For Boot | OFF | OFF | OFF | OFF | OFF |
| Mobile Mode | ON | OFF | ON | OFF | OFF |
| Full Operation | ON | ON | ON | ON | ON |
| Display Off | OFF | ON | OFF | ON | OFF |
| MFG Test Mode | OFF (SW Configured) | ON | OFF (SW Configured) | OFF (SW Configured) | OFF (SW Configured) |

FIG. 10

VIRTUAL REALITY SYSTEM AND METHOD FOR CONTROLLING OPERATION MODES OF VIRTUAL REALITY SYSTEM

CROSS REFERENCE TO RELATED APPLICATIONS

This application claims the benefit of U.S. Provisional Application No. 62/087,593, filed Dec. 4, 2014, and U.S. Provisional Application No. 62/170,878, filed Jun. 4, 2015, the entirety of which is incorporated by reference herein.

BACKGROUND OF THE INVENTION

Field of the Invention

The invention relates to a virtual reality system, and more particularly to a head mounted display apparatus for a virtual reality system.

Description of the Related Art

Displays with virtual image generation are often used in display devices which are located close to the eyes, so-called near-to-eye displays. Such display devices are known, for example, as head mounted displays (HMD).

An HMD is a display device that a person wears on the head in order to have video information directly displayed in front of the eyes. HMDs are also known as near-to-eye displays. An HMD has either one or two small CRT, LCD or OLED displays with magnifying lenses and other optical elements. The displays and optics are typically embedded in a helmet, glasses, or a visor, which a user can wear. Lenses and other optical components are used to give the user the perception that the images are coming from a greater distance, to prevent eyestrain. In HMDs that use a single display, the image is typically projected through optics that split the image into two identical images, and redirects each image to the respective eye. With two displays, the HMD can show stereoscopic images. The stereoscopic images attempt to create depth in the images by simulating the angular difference between the images viewed by each eye when looking at an object, due to the different positions of the eyes. This angular difference is one of the key parameters the human brain uses in processing images to create depth perception or distance in human vision.

BRIEF SUMMARY OF THE INVENTION

A virtual reality system and a method for controlling the operation modes of a virtual reality system are provided. An embodiment of a virtual reality system is provided. The virtual reality system comprises a host device, a transmission cable, and a head mounted display apparatus to be worn by a user and coupled to the host device via the transmission cable. The head mounted display apparatus comprises a multimedia module, a multi-sensing module, a peripheral hub, a power management device, and a micro control unit. The multimedia module receives multimedia content from the host device via a first signal path of the transmission cable. The multi-sensing module obtains sensing information regarding the head mounted display apparatus and the user. The peripheral hub receives communication data from the host device via a second signal path of the transmission cable, and provides the sensing information to the host device via the second signal path of the transmission cable. The power management device controls power status of the multimedia module, the multi-sensing module, and the peripheral hub according to a power voltage from the host device via a third signal path of the transmission cable. The micro control unit detects which mode the virtual reality system is operating in according to the signal status of the first and second signal paths of the transmission cable, so as to notify the power management device to control the power status of the multimedia module, the multi-sensing module, and the peripheral hub.

Furthermore, a method for controlling operation modes of a virtual reality system is provided. The virtual reality system comprises a host device, a head mounted display apparatus to be worn by the user, and a transmission cable coupled between the host device and the head mounted display apparatus. The head mounted display apparatus detects whether a first signal exists in a first signal path of the transmission cable when a power voltage from the host device is received. The head mounted display apparatus detects whether a second signal exists in a second signal path of the transmission cable when the first signal is received. The head mounted display apparatus controls the head mounted display apparatus to operate in a full operation mode when the first signal exists in the first signal path of the transmission cable and the second signal exists in the second signal path of the transmission cable. The head mounted display apparatus controls the head mounted display apparatus to operate in a mobile mode when the first signal exists in the first signal path of the transmission cable and the second signal does not exist in the second signal path of the transmission cable.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 6C shows an exemplary architecture of the virtual reality system of FIG. 1 according to another embodiment of the invention;

FIG. 10 shows a table illustrating the multiple power operation modes provided by a virtual reality system according to an embodiment of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
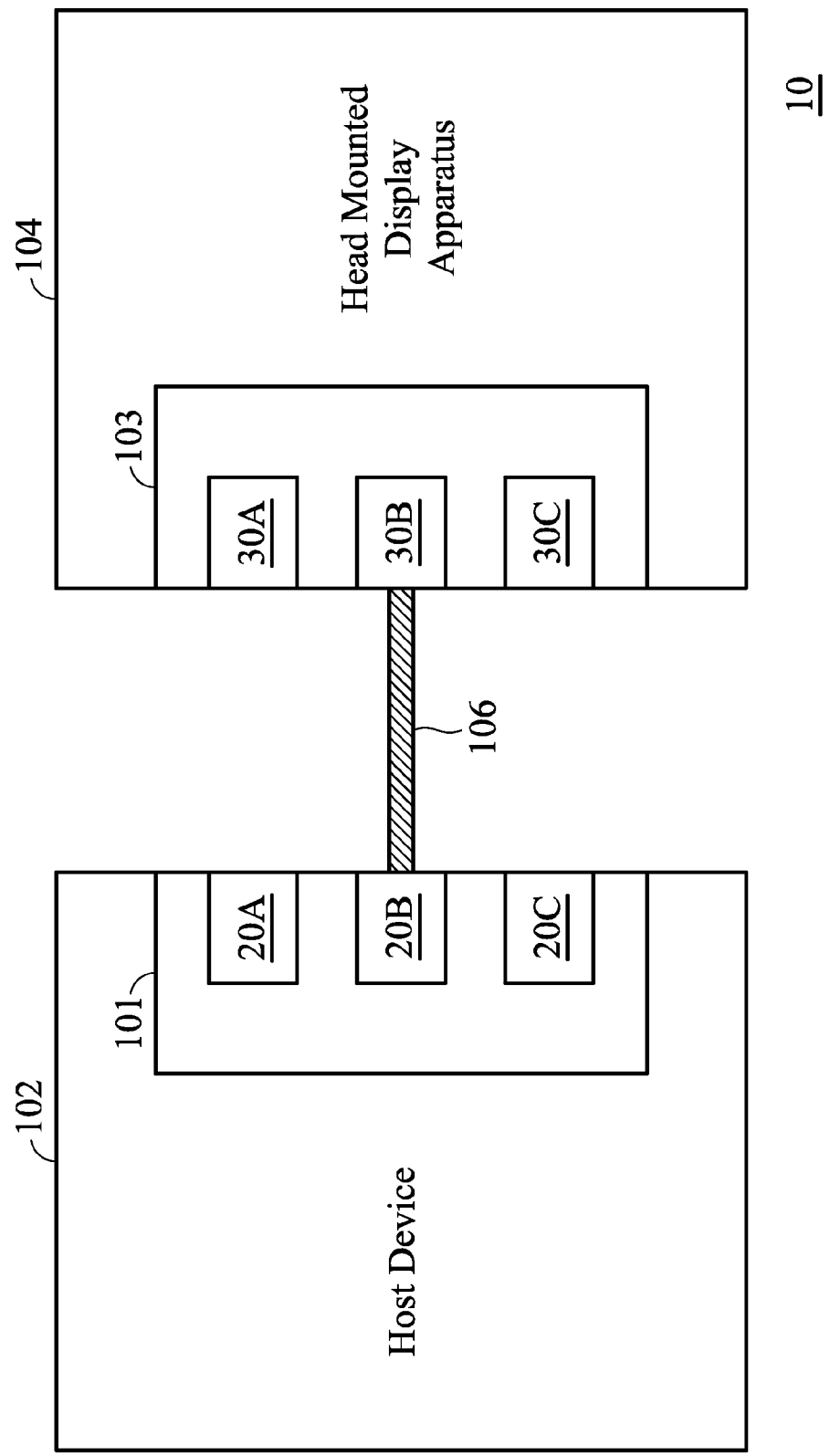
FIG. 1 shows a virtual reality system according to an embodiment of the invention.

FIG. 1 shows a virtual reality system 10 according to an embodiment of the invention. The virtual reality system 10 comprises a host device 102, a head mounted display apparatus 104 to be worn by a user, and a transmission cable 106 (optional) connected between an interface unit 101 of the host device 102 and an interface unit 103 of the head mounted display apparatus 104. The interface unit 101 of the host device 102 comprises a first host interface 20A for providing a multimedia content CXT to the head mounted display apparatus 104, a second host interface 20B for providing communication data DAT to the head mounted display apparatus 104, and a third host interface 20C for providing a power voltage PWR to power the head mounted display apparatus 104. Furthermore, the interface unit 103 of the head mounted display apparatus 104 has a first slave interface 30A capable of being coupled to the first host interface 20A via the transmission cable 106, a second slave interface 30B capable of being coupled to the second host interface 20B via the transmission cable 106, and a third slave interface 30C capable of being coupled to the third host interface 20C via the transmission cable 106. The head mounted display apparatus 104 is capable of playing the multimedia content CXT from the host device 102, and sensing information $INFO_S$ regarding the head mounted display apparatus 104 and/or the user. Based on the information sensed by the head mounted display apparatus 104, the host device 102 can timely modulate the multimedia content CXT. In one embodiment, the host device 102 is capable of processing a multimedia source and generating the multimedia content CXT according to the multimedia source and the information sensed by the head mounted display apparatus 104.

Figure 2:
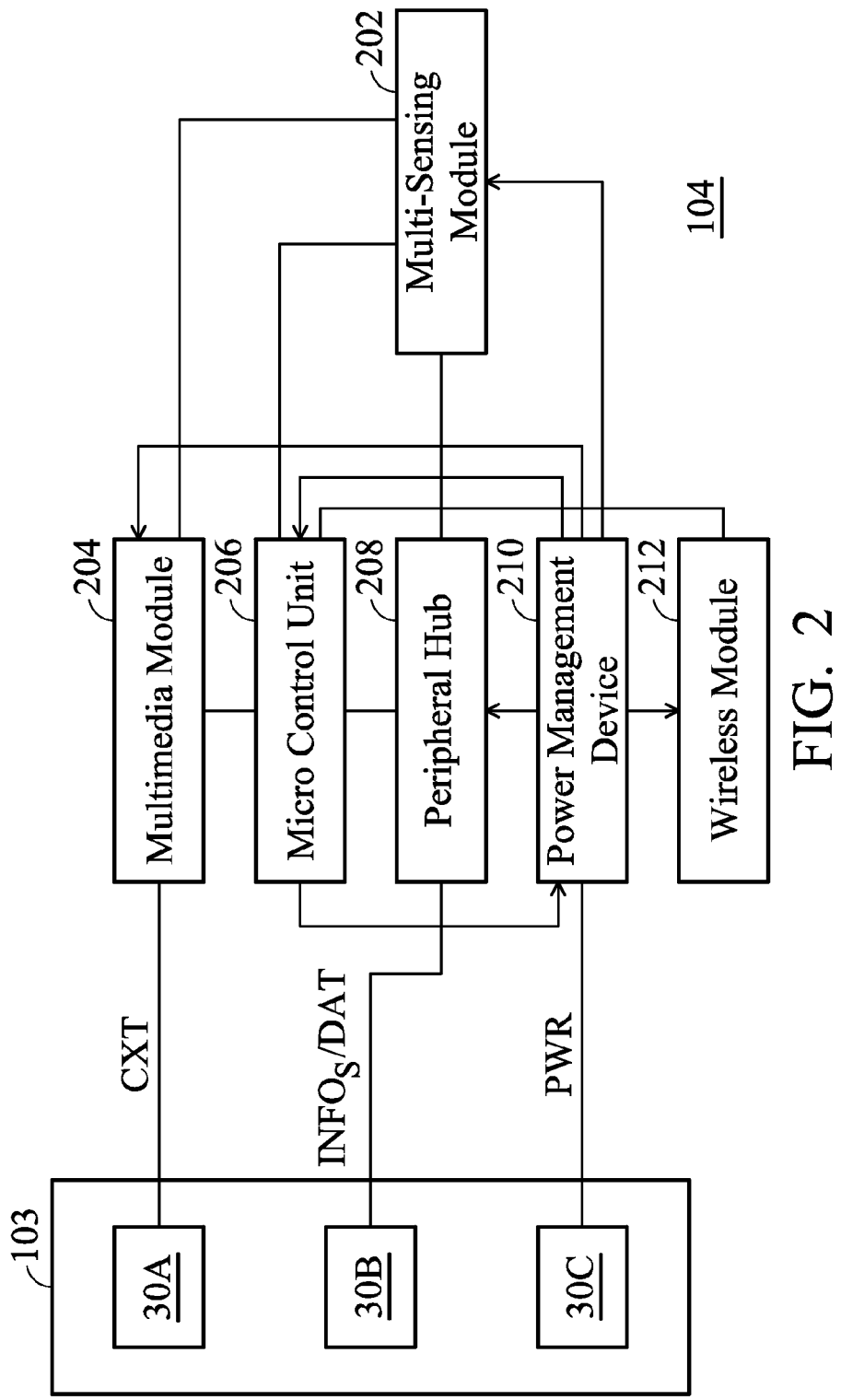
FIG. 2 shows an example of the head mounted display apparatus of FIG. 1 according to an embodiment of the invention.

FIG. 2 shows an example of the head mounted display apparatus 104 of FIG. 1 according to an embodiment of the invention. In the embodiment, the head mounted display apparatus 104 further comprises a multi-sensing module 202, a multimedia module 204, a micro control unit 206, a peripheral hub 208, a power management device 210, and a wireless module 212. The multi-sensing module 202 can sense the position of the user, the biometrical status of the user, and/or the environment surrounding the head mounted display apparatus 104 to generate the sensing information $INFO_S$ when the user is wearing the head mounted display apparatus 104. In an exemplary embodiment, the sensing information $INFO_S$ may comprise position information $INFO_P$, user information $INFO_U$, and/or environment information $INFO_E$. The position information $INFO_P$ can comprise movement information, orientation information, tilt angle information, and/or location information regarding the head mounted display apparatus 104. The user information $INFO_U$ can comprise biometrical information about the user and/or eye view information sensed by the multi-sensing module 202. Furthermore, the environment information $INFO_E$ can comprise images/video and/or depth information captured by the multi-sensing module 202.

In FIG. 2, the multimedia module 204 can receive the multimedia content CXT from the first host interface 20A of the host device 102 of FIG. 1 through the first slave interface 30A of the head mounted display apparatus 104. The multimedia module 204 can process and play the multimedia content CXT, e.g. audio, image, or video content. The multimedia module 204 can be coupled to the multi-sensing module 202, so as to obtain the sensing information $INFO_S$, and thus display parameters, such as brightness and refresh time, can be modulated by the multimedia module 204 according to the sensing information $INFO_S$. Furthermore, the micro control unit (MCU) 206 is electrically coupled to the multi-sensing module 202 and the multimedia module 204. The micro control unit 206 can issue control information to coordinate functions of the multi-sensing module 202 and the multimedia module 204 according to the communication data DAT from the host device 102. The micro control unit 206 can receive the sensing information $INFO_S$ from the multi-sensing module 202, and transmit the sensing information $INFO_S$ to the host device 102 via the peripheral hub 208 and the second slave interface 30B. The wireless module 212 can communicate with other remote device, such as a controller, and provides information from the other remote device to the micro control unit 206. Thus, the micro control unit 206 can issue the information to the host device 102 via the peripheral hub 208 and the second slave interface 30B.

Referring to FIG. 1 and FIG. 2 together, the peripheral hub 208 can receive the communication data DAT from the second host interface 20B of the host device 102 through the second slave interface 30B of the head mounted display apparatus 104. The peripheral hub 208 is coupled to the multi-sensing module 202, so as to receive the sensing information $INFO_S$. Furthermore, the peripheral hub 208 is also coupled to the micro control unit 206, so as to receive the control information. The peripheral hub 208 may be coupled to a plurality of peripheral devices of the head mounted display apparatus 104, such as microphones, speakers, or an extended hub. The peripheral hub 208 can provide the sensing information $INFO_S$ to the second host interface 20B of the host device 102 through the second slave interface 30B of the head mounted display apparatus 104. Furthermore, the power management device 210 can be connected to the third host interface 20C of the host device 102 through the third slave interface 30C of the head mounted display apparatus 104, so as to receive the power voltage PWR from the host device 102. In the embodiment, the power management device 210 is connected to each component of the head mounted display apparatus 104 for powering the components, including the multi-sensing module 202, the multimedia module 204, the micro control unit 206, the peripheral hub 208, and the wireless module 212. The power management device 210 comprises a plurality of power circuits, wherein each power circuit is capable of modulating a supply power according to the power voltage PWR from the host device 102, and providing the supply power to power the corresponding component according to the control information from the micro control unit 206. Specifically, the power management device 210 can perform power management control and peripheral control according to the control information from the micro control unit 206.

Figure 3:
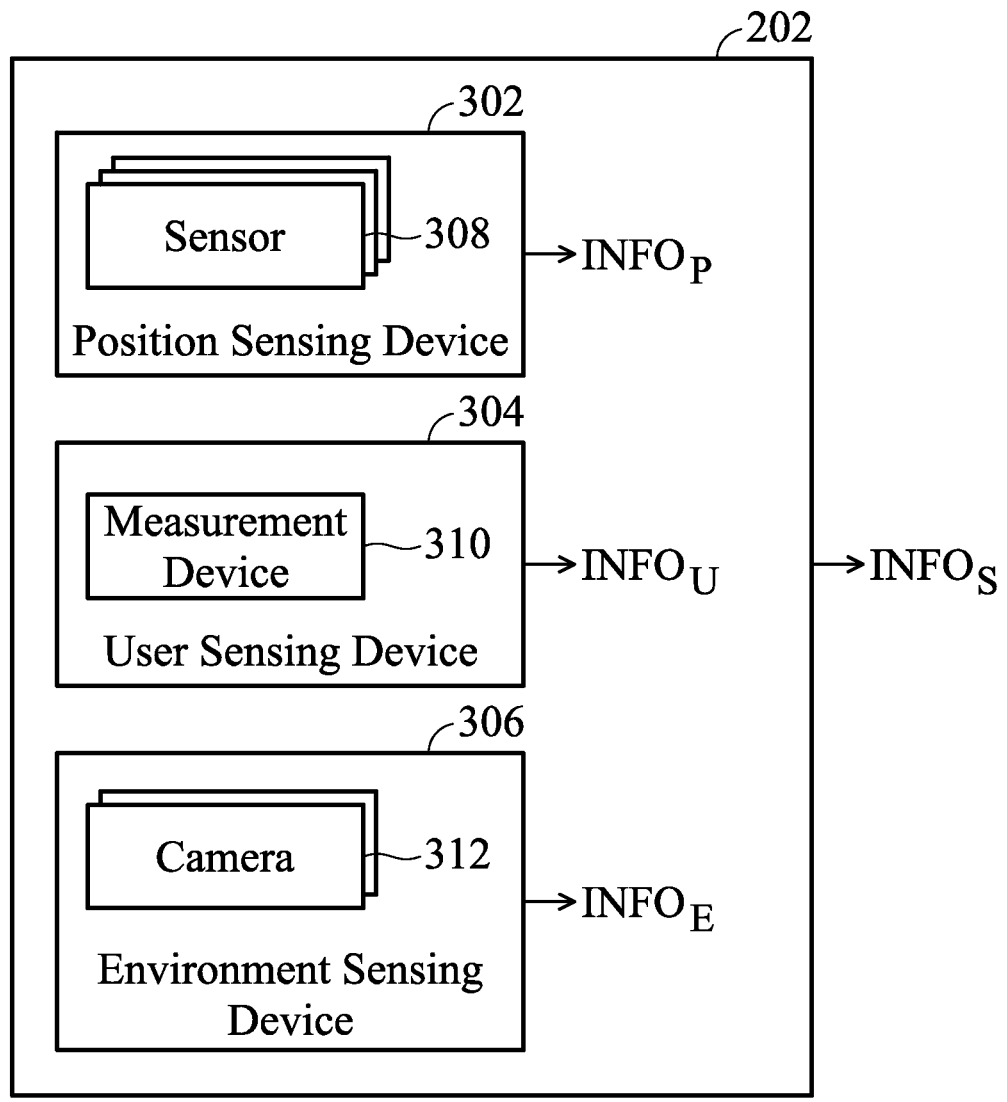
FIG. 3 shows an example of the multi-sensing module of FIG. 2 according to an embodiment of the invention.

FIG. 3 shows an example of the multi-sensing module 202 of FIG. 2 according to an embodiment of the invention. The multi-sensing module 202 comprises a position sensing device 302 for obtaining the position information $INFO_P$ corresponding to the head mounted display apparatus 104, a user sensing device 304 for obtaining the user information $INFO_U$, and/or an environment sensing device 306 for obtaining the environment information $INFO_E$, wherein the multi-sensing module 202 provides the sensing information $INFO_S$ according to the position information $INFO_P$, the user information $INFO_U$, and the environment information $INFO_E$. The position sensing device 302 comprises a plurality of sensors 308 for sensing the position information $INFO_P$ of the head mounted display apparatus 104. A position reference device can be located at a distance from the head mounted display apparatus 104, so as to wirelessly provide reference information to the position sensing device 302. Thus, the position sensing device 302 can use the reference information to generate the position information $INFO_P$. Furthermore, the user sensing device 304 comprises at least one measurement device 310 for sensing the user information $INFO_U$, such as an Inter-pupillary distance (IPD) measurement device for measuring eye view information of the user, e.g. a visual angle of the user. The environment sensing device 306 comprises at least two cameras 312 for capturing images/video of objects which the head mounted display apparatus 104 is facing, and obtaining the depth information of the objects in relative to the head mounted display apparatus 104. A depth map can be calculated by the head mounted display apparatus 104 or the host device 102 according to the depth information. Furthermore, the camera lens of the cameras 312 can be moved by the micro control unit 206, so as to obtain more depth information for the depth map. The cameras 312 are spatially separated apart from each other. The cameras 312 can capture images and generate parallax information of the captured images, wherein the field of view (FOV) of the cameras at least partially overlap so that the parallax information can be generated. The parallax information can be provided to the host device 102 as depth information, which can be calculated by the host device 102, so as to generate a depth map or a depth model of the space or object faced by the head mounted display apparatus 104. In one embodiment, the cameras 312 are allocated in parallel and with a tilt angle between the viewing direction at which the head mounted display apparatus 104 can be viewed by the user. With the tilt angle, the cameras 312 can sense the lower region which the head mounted display apparatus 104 is facing. Moreover, the host device 102 is capable of monitoring a clear zone in which the head mounted display apparatus 104 is facing according to the depth information. Thus, the virtual reality system 10 is capable of alerting the user when the clear zone falls into a short distance range. For example, the head mounted display apparatus 104 and the host device 102 can alert the user to obstructions in a room.

Figure 4:
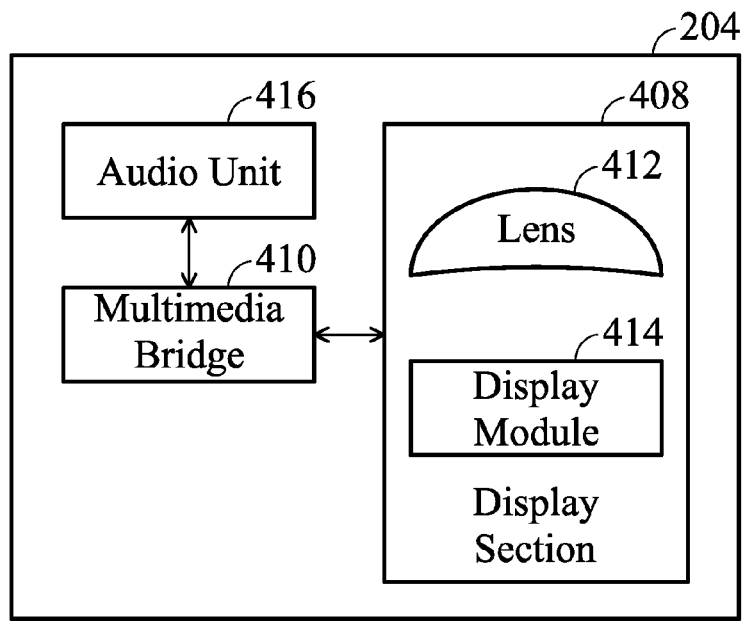
FIG. 4 shows an example of the multimedia module of FIG. 2 according to an embodiment of the invention.

FIG. 4 shows an example of the multimedia module 204 of FIG. 2 according to an embodiment of the invention. The multimedia module 204 can process and play the multimedia content CXT, e.g. audio, image, or video content. The multimedia module 204 comprises at least one display section 408 and a multimedia bridge 410. Each display section 408 can comprise a lens 412, and a display module 414. The audio unit 416 is capable of delivering audio sounds of the multimedia content CXT (i.e. the audio part of the multimedia content CXT) or recording sounds from the user or environment. The audio unit 416 is coupled to the multimedia bridge 410 for an audio playback function. Furthermore, referring to FIG. 4 and the FIG. 2 together, the audio unit 416 is coupled to the peripheral hub 208 for a microphone function when a microphone is coupled to the peripheral hub 208. The audio unit 416 may comprise an audio codec for coding/decoding audio signals of the multimedia content CXT, and for coding/decoding the signals of the microphone and/or a speaker/earphone coupled to the peripheral hub 208. The multimedia bridge 410 is coupled between the first slave interface 30A of the head mounted display apparatus 104 and the display section 408 for transforming the multimedia content CXT (e.g. the video part of the multimedia content) into display signals that are readable by the display section 408.

Referring back to FIG. 1 and FIG. 2 together, the virtual reality system 10 can operate in various power-saving modes. If the head mounted display apparatus 104 operates in a predetermined condition, the host device 102 can send the communication data DAT to the micro control unit 206, so as to perform a power-saving operation on the head mounted display apparatus 104. The micro control unit 206 is capable of performing a first power-saving operation on the multi-sensing module 202 when the multi-sensing module 202 has been operated in a predetermined condition. For example, if the host device 102 generates or modulates the multimedia content CXT without using the sensing information $INFO_S$, the host device 102 can control the micro control unit 206 to turn off the multi-sensing module 202 via the transmission cable 106. The head mounted display apparatus 104 may comprise a sensor (not shown) for monitoring whether the head mounted display apparatus 104 is worn by a user. Furthermore, the sensor is also capable of transmitting a trigger signal to the micro control unit 206 according to the result of said monitoring operation showing that the head mounted display apparatus 104 is not worn by the user. In response to the trigger signal, the micro control unit 206 can perform a second power-saving operation on the multimedia module 204 and/or the multi-sensing module 202. The sensor can be a capacitive sensor embedded inside the head mounted display apparatus 104 and facing inward for detecting whether the head mounted display apparatus 104 is worn by the user. Moreover, the transmission cable 106 is coupled between the host device 102 and head mounted display apparatus 104, and is capable of transmitting the multimedia content CXT, the communication data DAT, and the power voltage PWR from the host device 102 to the head mounted display apparatus 104. Furthermore, the transmission cable 106 can transmit the sensing information $INFO_S$ from the head mounted display apparatus 104 to the host device 102. In another embodiment, the multimedia content CXT, the communication data DAT, or the sensing information $INFO_S$ can be transmitted wirelessly between the host device 102 and the head mounted display apparatus 104 by using wireless communication technologies, e.g. WiGig technology.

Figure 5:
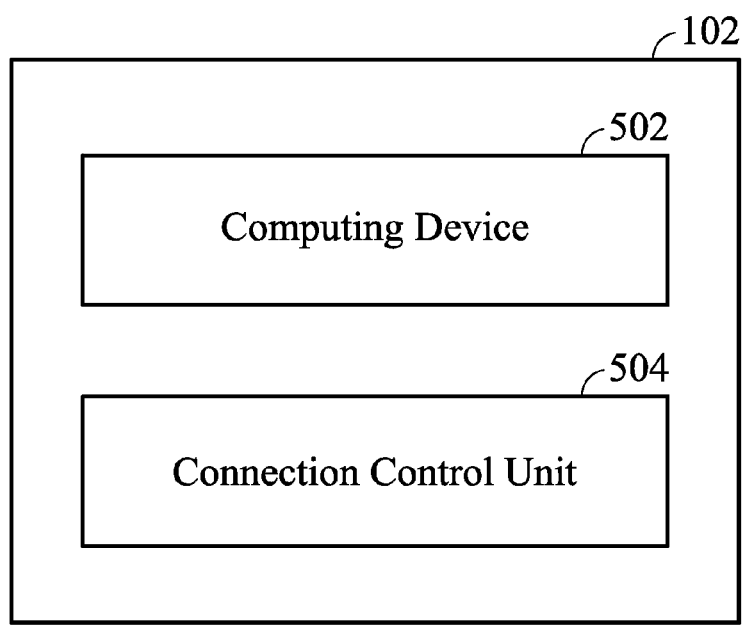
FIG. 5 shows an example of the host device of FIG. 1 according to an embodiment of the invention.

FIG. 5 shows an example of the host device 102 of FIG. 1 according to an embodiment of the invention. The host device 102 comprises a computing device 502 for generating the multimedia content CXT. The computing device 502 may be a personal computer, NB, or a smart phone or any other portable device with a powerful processor inside. The computing device 502 can receive a multimedia source from a storage unit or Internet network, and the computing device 502 is capable of generating the multimedia content CXT according to the multimedia source and the sensing information $INFO_S$ from the head mounted display apparatus 104. The computing device 502 is also capable of generating the communication data according to the sensing information $INFO_S$. The host device 102 may further comprise a connection control unit 504 coupled between the computing device 502 and the transmission cable 106 of FIG. 1, wherein the connection control unit 504 is capable of enhancing the signal strength of the communication data DAT and/or the sensing information $INFO_S$ communicated between the computing device 502 and the connection control unit 504. Furthermore, the connection control unit 504 can connect to a power source, so that the connection control unit 504 is capable of transmitting the power voltage PWR to a power path of the transmission cable 106. In one embodiment, the connection control unit 504 comprises a switch, which is used to control the supply of the multimedia content CXT, the communication data DAT, and/or the power voltage PWR to the transmission cable 106.

Figure 6A:
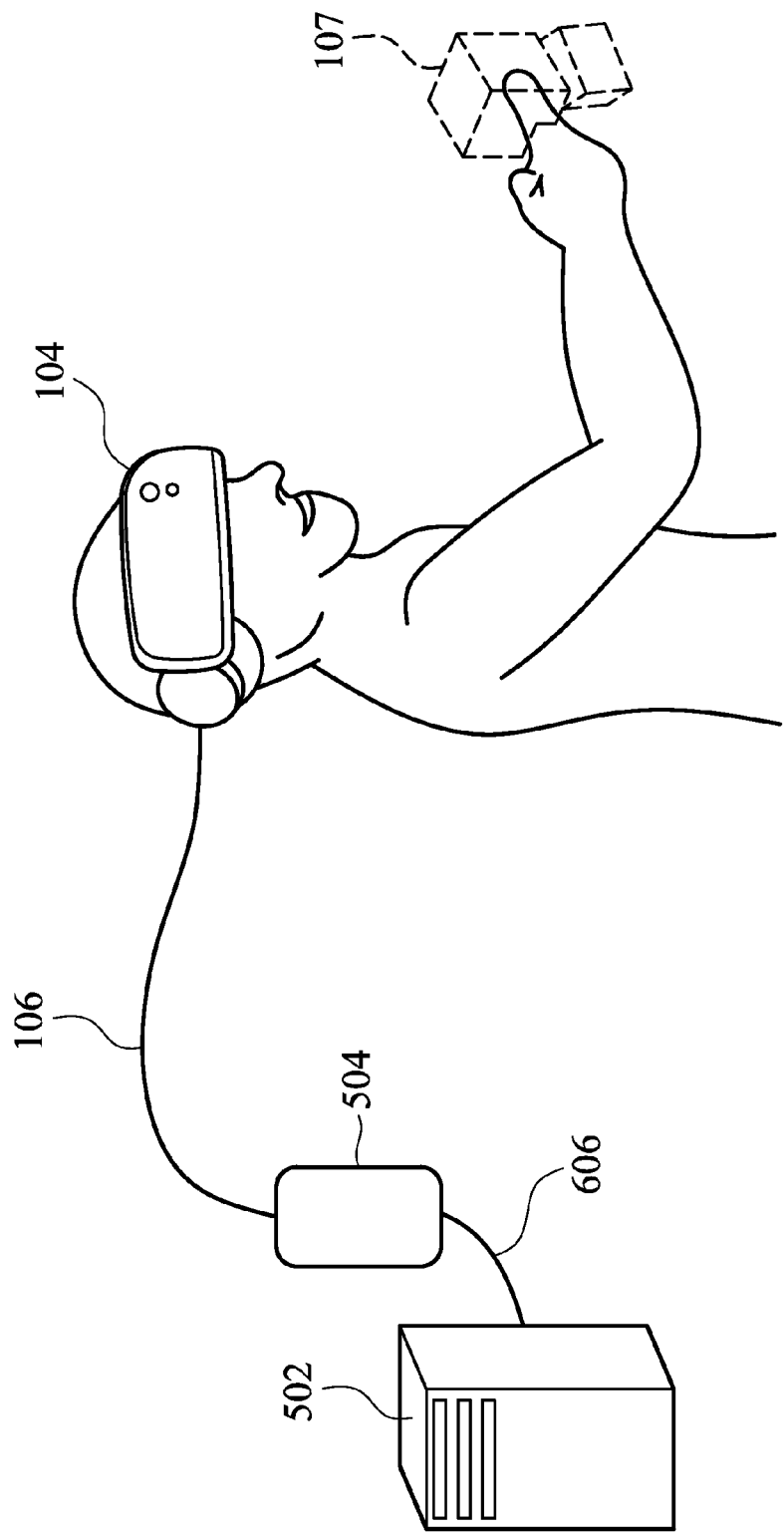
FIG. 6A shows an exemplary architecture of the virtual reality system of FIG. 1 according to an embodiment of the invention.

FIG. 6A shows an exemplary architecture of the virtual reality system 10 of FIG. 1 according to an embodiment of the invention. In FIG. 6A, the connection control unit 504 is connected to the computing device 502 through a pre-stage cable 606. The pre-stage cable 606 can transmit the multimedia content CXT, the communication data DAT, and the sensing information $INFO_S$ between the computing device 502 and the connection control unit 504, and it can transmit the power voltage PWR from the power source to the connection control unit 504. The connection control unit 504 is connected to the head mounted display apparatus 104 via the transmission cable 106. The transmission cable 106 can transmit the multimedia content CXT, the communication data DAT, the sensing information $INFO_S$, and/or the power voltage PWR between the connection control unit 504 and the head mounted display apparatus 104. In the embodiment, label 107 represents the virtual objects that are viewed by the user wearing the head mounted display apparatus 104.

Figure 6B:
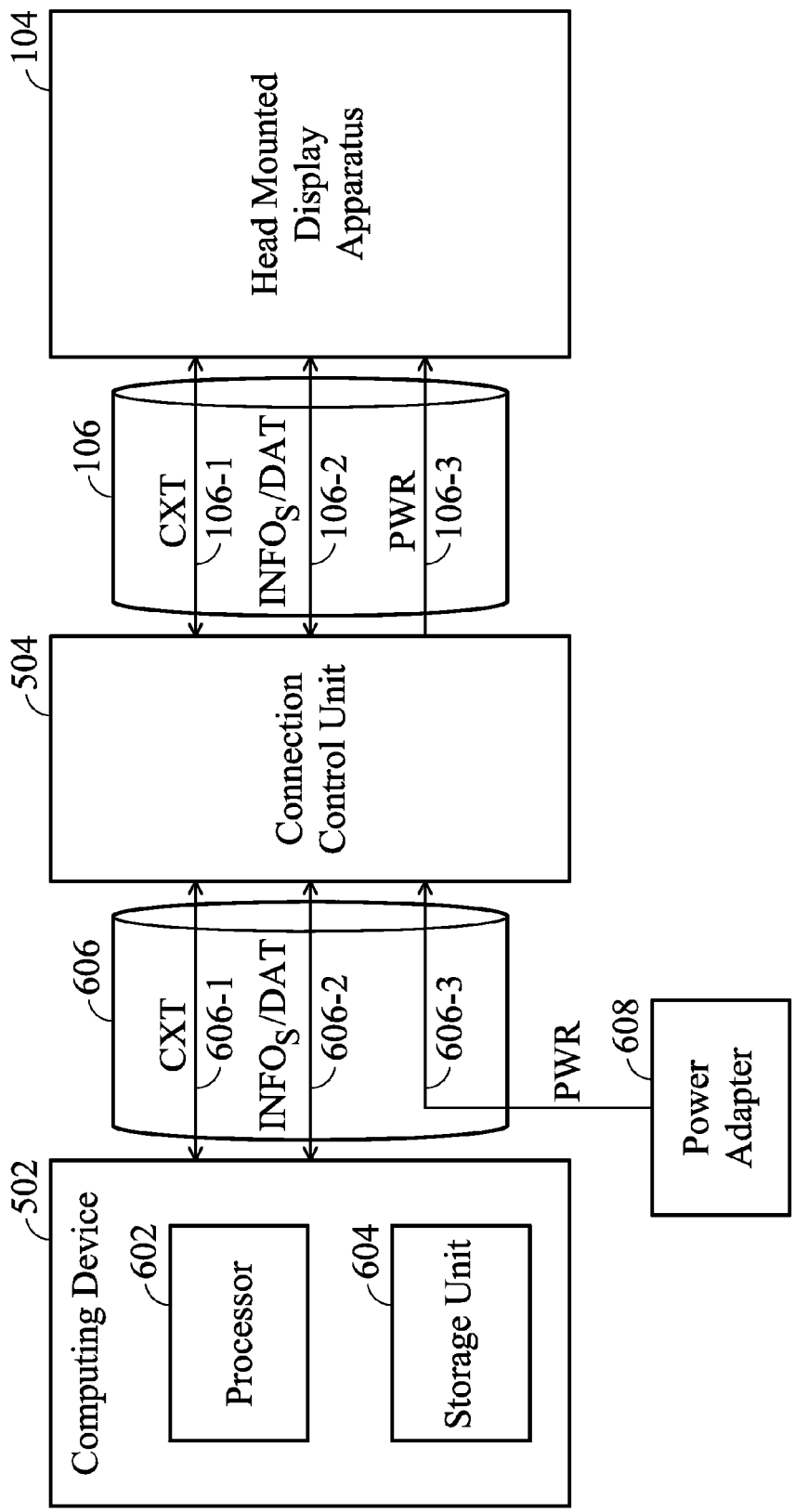
FIG. 6B shows a schematic illustrating connection architecture inside the virtual reality system according to the architecture of FIG. 6A.

FIG. 6B shows a schematic illustrating a connection architecture inside the virtual reality system 10 according to the architecture of FIG. 6A. In the embodiment, the computing device 502 can comprise a processor 602 and a storage unit 604, wherein the computing device 502 is capable of providing the multimedia source. The processor 602 can generate the multimedia content CXT according to the multimedia source and the sensing information $INFO_S$ from the head mounted display apparatus 104 via the pre-stage cable 606. The processor 602 can also generate the communication data DAT according to the sensing information $INFO_S$. The pre-stage cable 606 comprises a pre-stage multimedia path 606-1 for transmitting the multimedia content CXT, a pre-stage communication path 606-2 for transmitting the communication data DAT and/or the sensing information $INFO_S$, and a pre-stage power path 606-3 for providing the power voltage PWR to the connection control unit 504. In the embodiment, the connection control unit 504 is connected to a power adapter 608 via the pre-stage power path 606-3. It should be noted that the power adapter 608 can be integrated in or independent from the computing device 502. The power adapter 608 can provide the power voltage PWR to the connection control unit 504 through the pre-stage power path 606-3. The transmission cable 106 can comprise a multimedia path 106-1 for transmitting the multimedia content CXT, a communication path 106-2 for transmitting the communication data DAT and/or the sensing information $INFO_S$, and a power path 106-3 for transmitting the power voltage PWR.

FIG. 6C shows an exemplary architecture of the virtual reality system 10 of FIG. 1 according to another embodiment of the invention. The computing device 502 is capable of wirelessly transmitting the multimedia content CXT to the connection control unit 504 and wirelessly receiving the sensing information $INFO_S$ from the connection control unit 504. The connection control unit 504 may comprise a transceiver 505 for wirelessly communicating with the computing device 502. Furthermore, at least one of the connection control unit 504 and the head mounted display apparatus 104 comprises a receiving device with at least two antennas each facing a different direction for wirelessly receiving information, e.g. the multimedia content CXT, from the computing device 502. The receiving device can be circular and can be mounted on a belt or other wearable apparatus. For example, the head mounted display apparatus 104 may comprise a helmet, wherein the circular receiving device is encircled around the helmet. The head mounted display apparatus 104 can comprise a receiver for receiving wireless signals from the computing device 502 via the circular receiving device. Since the head mounted display apparatus 104 is to be worn on the head of a user during operation, the user's body, hands or furniture in front of the user will not obstruct the transmission of the wireless signals from the computing device 502.

Figure 6D:
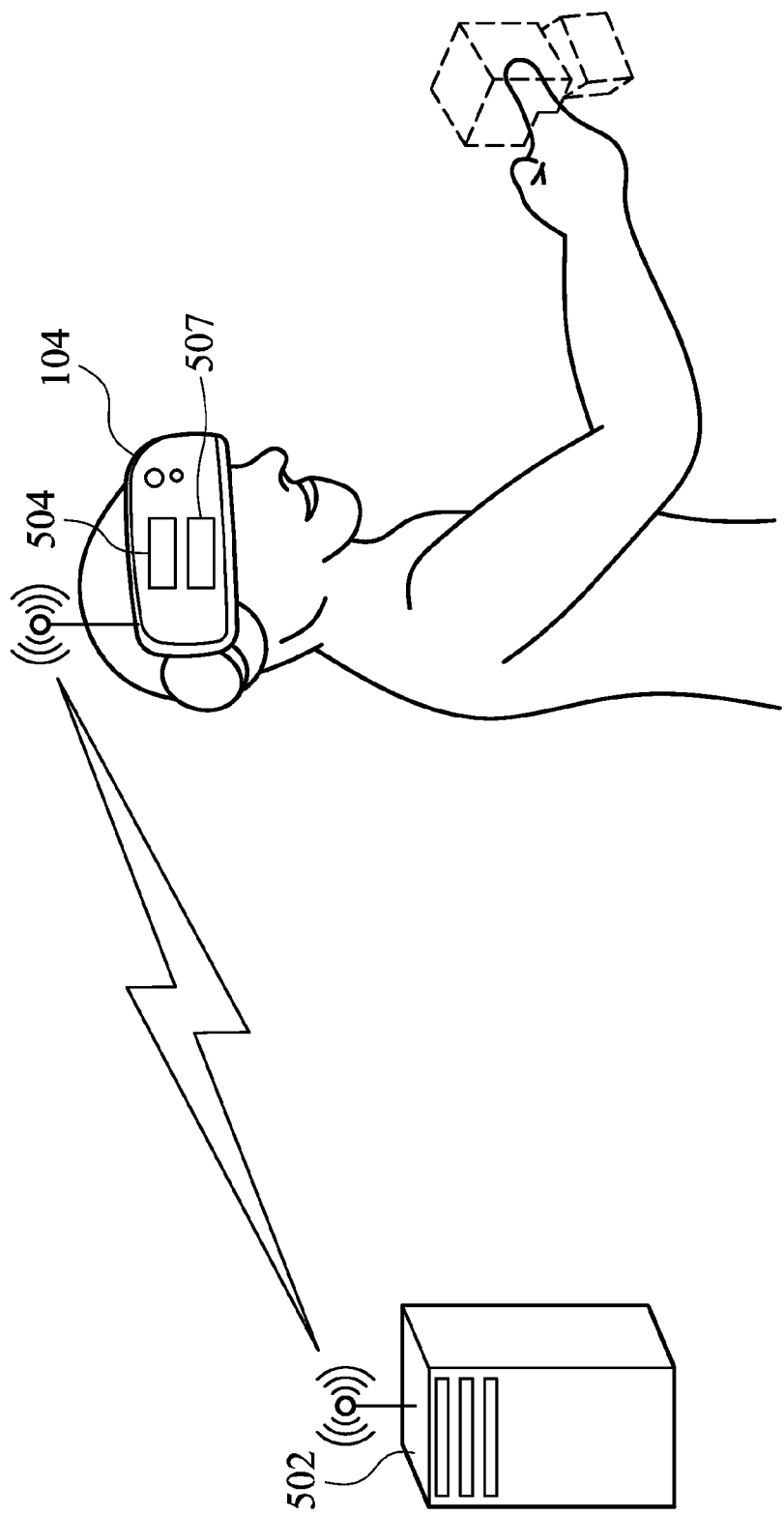
FIG. 6D shows an exemplary architecture of the virtual reality system of FIG. 1 according to another embodiment of the invention.

FIG. 6D shows an exemplary architecture of the virtual reality system 10 of FIG. 1 according to another embodiment of the invention. The computing device 502 is capable of wirelessly transmitting the multimedia content CXT to the connection control unit 504 and wirelessly receiving the sensing information $INFO_S$ from the connection control unit 504. The connection control unit 504 may be allocated inside the head mounted display apparatus 104, e.g. the connection control unit 504 is integrated into the head mounted display apparatus 104. The head mounted display apparatus 104 may comprise a transceiver 507 for wirelessly communicating with the computing device 502. The head mounted display apparatus 104 may comprise a power source such as a battery (not shown). As described above, the head mounted display apparatus 104 may also comprise the circular receiving device for receiving wireless signals, which comprises video and/or audio data, transmitted from the computing device 502.

Figure 7:
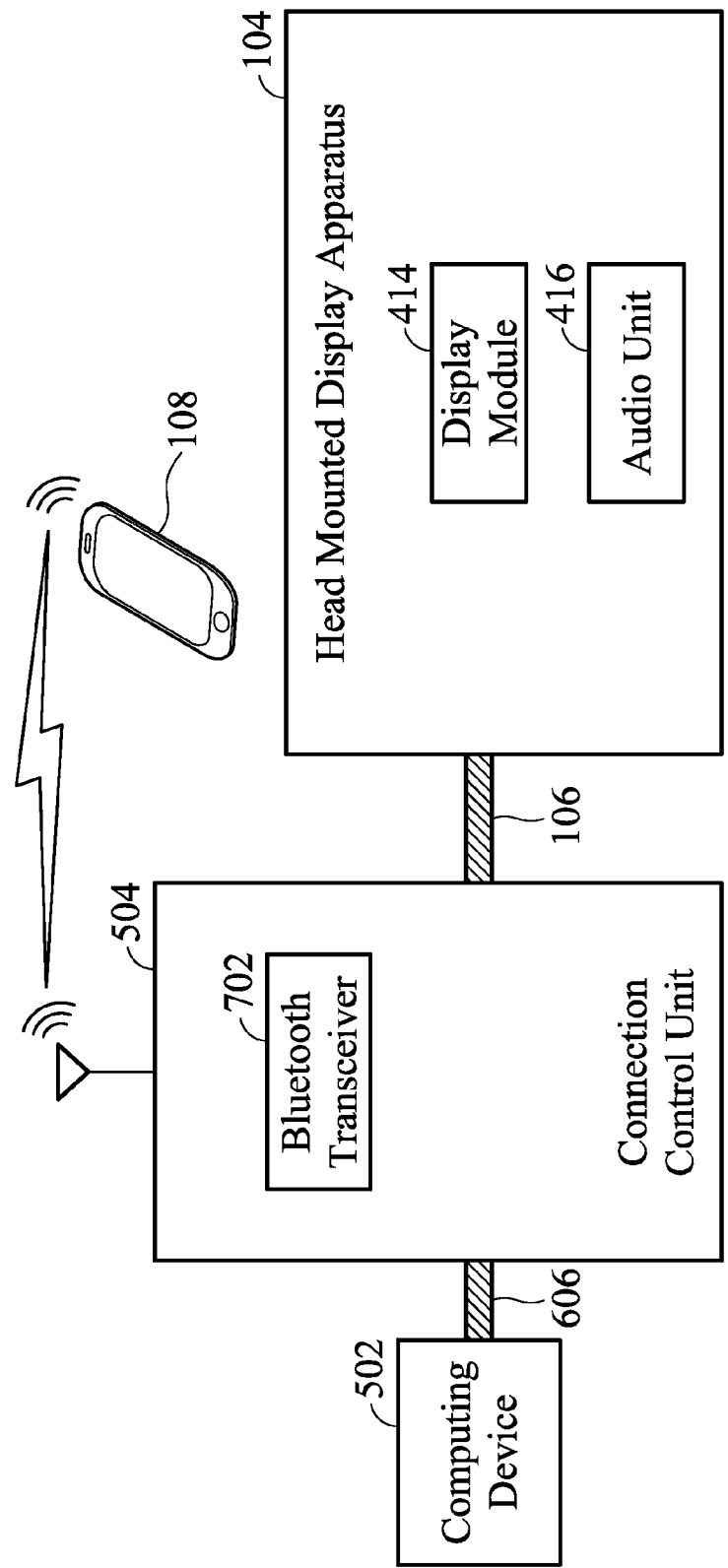
FIG. 7 shows a virtual reality system according to another embodiment of the invention.

FIG. 7 shows a virtual reality system according to another embodiment of the invention. In FIG. 7, a mobile phone 108 can receive and transmit Bluetooth signals in response to an event such as a phone call. The connection control unit 504 can comprise a Bluetooth transceiver 702 for communicating with the mobile phone 108. The computing device 502 can process the Bluetooth signals received from the connection control unit 504 and generate alarm indicators to inform the user about the event via the display module 414 and/or the audio unit 416. The computing device 502 may perform a remote-answer application so that the user can answer a phone call through the audio unit 416. In some embodiments, the computing device 502 can mute or lower the sound of the multimedia content CXT and play the sound of the remote-answer application. The audio unit 416 of the head mounted display apparatus 104 can record the user's sound, and then transmit the sound information through the Bluetooth transceiver 702 of the connection control unit 504 directly to the mobile phone 108 without passing through the computing device 502.

Figure 8:
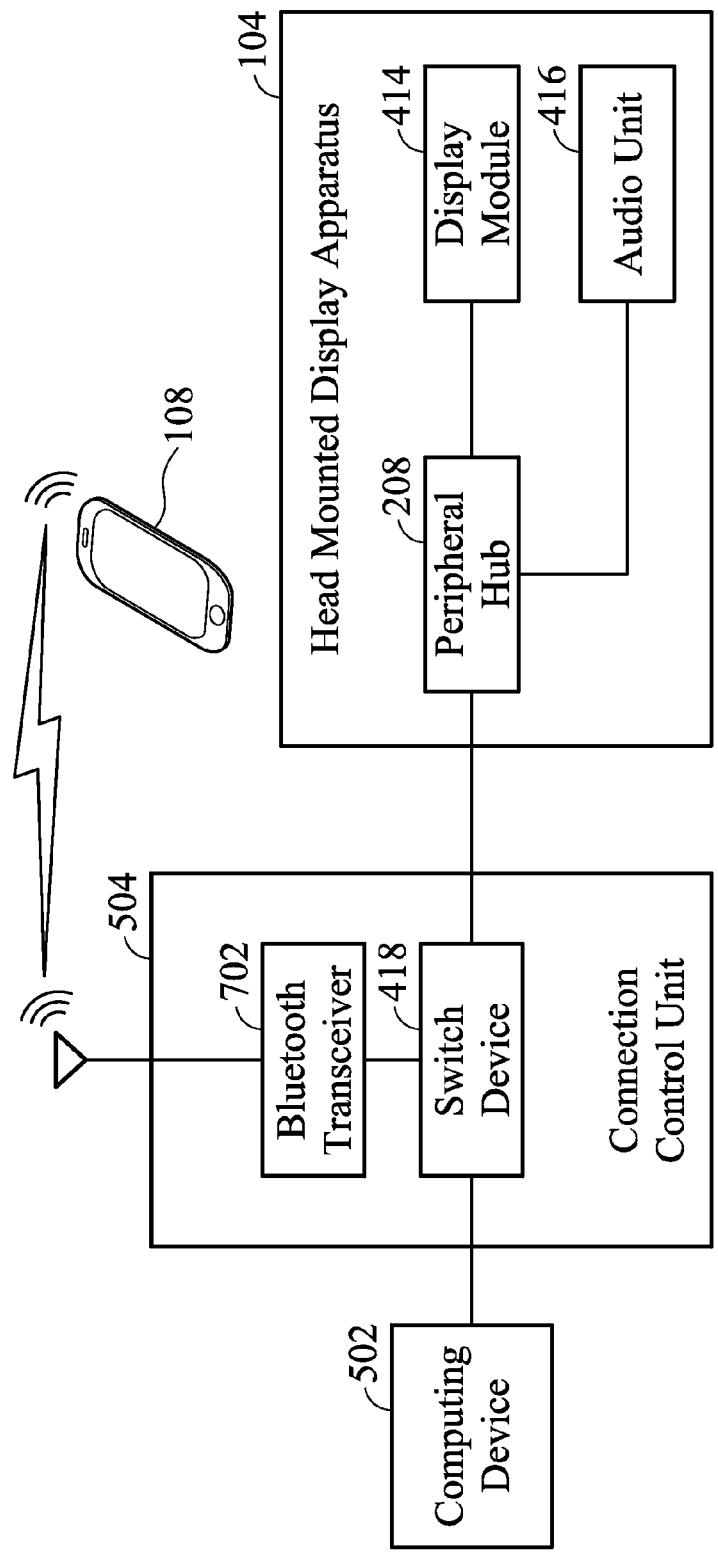
FIG. 8 shows an exemplary architecture of a virtual reality system according to another embodiment of the invention.

FIG. 8 shows an exemplary architecture of a virtual reality system 10 according to another embodiment of the invention. In FIG. 8, the connection control unit 504 may comprise a switch device 418 for switching the authority of the Bluetooth transceiver 702. The switch device 418 may comprise a host circuit for receiving request and audio signals from the computing device 502 and the peripheral hub 208. The switch device 418 can provide a Bluetooth communication path for the peripheral hub 208 upon request so that audio signals of the remote-answer application can be communicated between the mobile phone 108 and the head mounted display device 104 directly without passing through the computing device 502.

Figure 9:
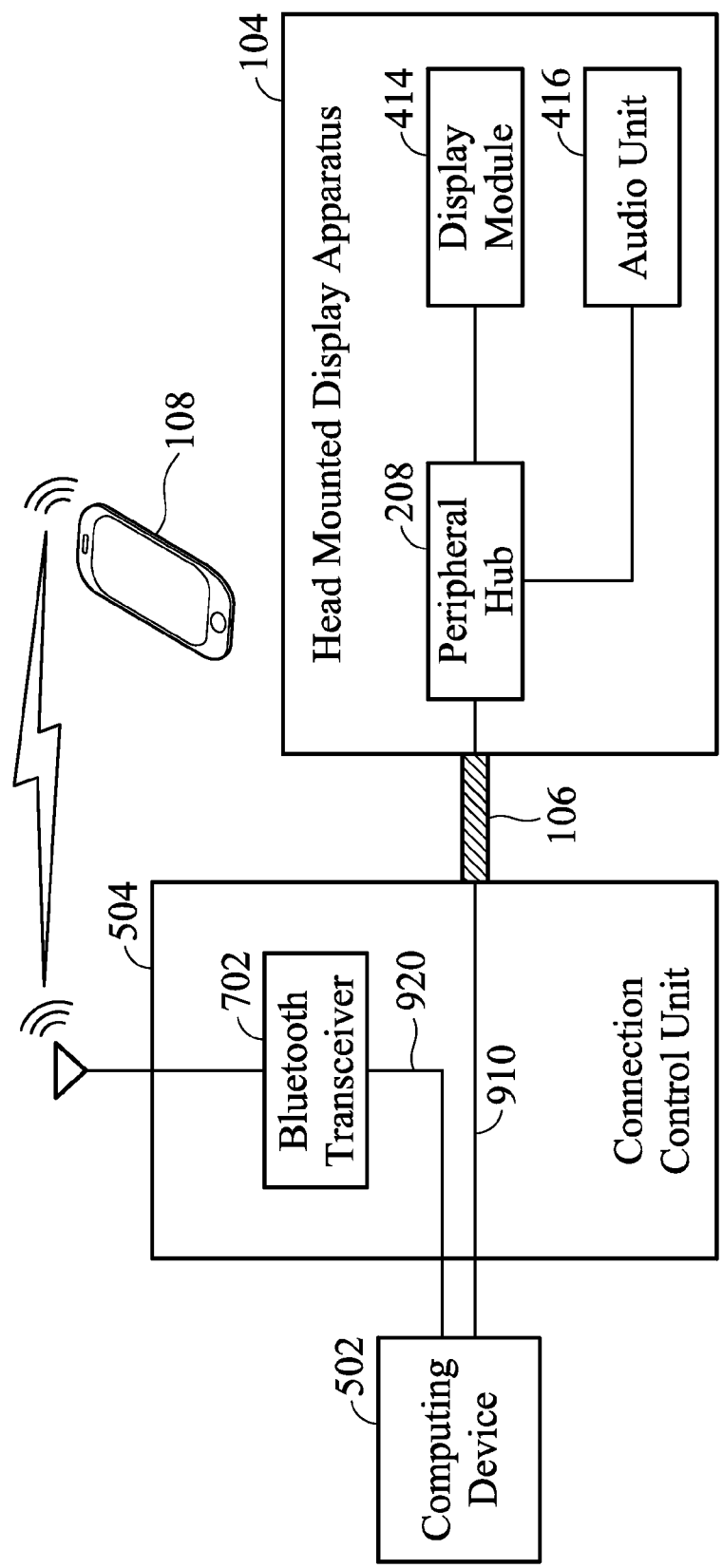
FIG. 9 shows an exemplary architecture of a virtual reality system according to another embodiment of the invention.

FIG. 9 shows an exemplary architecture of a virtual reality system according to another embodiment of the invention. In FIG. 9, the connection control unit 504 may comprise a first signal path 910 connected between the computing device 502 and the peripheral hub 208 and a second signal path 920 connected between the computing device 502 and the Bluetooth transceiver 702 of the connection control unit 504. The recorded audio sounds of the user can be transmitted from the peripheral hub 208 to the computing device 502 through the first signal path 910. The computing device 502 can process the recorded audio sounds, and then transmit the sound signals through the second signal path 920 to the mobile device 108. The audio signal from the mobile device 108 can be sent to the computing device 502 through the second signal path 920. Accordingly, the computing device 502 can send the audio signals to the audio unit 416 of the head mounted display apparatus 104 through the first signal path 910. For example, the computing device 502 converts the audio signals into the multimedia content CXT, and provides the multimedia content CXT to the head mounted display apparatus 104, wherein the second signal path 910 comprises the transmission cable 106. In another embodiment, the Bluetooth transceiver 702 can be replaced with a wireless signal transceiver capable of transmitting/receiving audible sound, images and/or video captured by the mobile phone 108, and the head mounted display apparatus 104 can play the audio sound, images, and/or video received by the wireless signal transceiver.

FIG. 10 shows a table illustrating the multiple power operation modes provided by a virtual reality system according to an embodiment of the invention. Referring to FIGS. 1-4 and 10 together, the virtual reality system 10 can provide a waiting for boot mode, a mobile mode, a full operation mode, a display off mode, and/or a manufacturing (MFG) test mode. The head mounted display apparatus 104 can detect in which mode the virtual reality system 10 is operating according to the signal status of the first slave interface 30A, the second slave interface 30B, and the third slave interface 30C of the head mounted display apparatus 104, and the pressing situation of a power button (not shown) on the head mounted display apparatus 104. In the waiting for boot mode, the power status of the multimedia bridge 410, the peripheral hub 208, the audio unit 416, the position sensing device 302, and the user sensing device 304 are inactive (i.e. "OFF"), i.e. the multimedia bridge 410, the peripheral hub 208, the audio unit 416, the position sensing device 302, and the user sensing device 304 are disabled by the micro control unit 206. Furthermore, in the mobile mode, the virtual reality system 10 may be used to play a movie, and there may be no requirement to sense the position or the environment. In the mobile mode, the power status of the multimedia bridge 410 and the audio unit 416 are active (i.e. "ON"), and the power status of the peripheral hub 208, the position sensing device 302, and the user sensing device 304 are inactive (i.e. "OFF"). In the full operation mode, the power status of the multimedia bridge 410, the peripheral hub 208, the audio unit 416, the position sensing device 302, and the user sensing device 304 are active. If it is detected that the user is not wearing the head mounted display apparatus 104, the virtual reality system will enter the display off mode. Thus, the multimedia module 204 is disabled. However, the position sensing device 302 is active so that the host device 102 can detect whether the head mounted display apparatus 104 is moved. Accordingly, in the display off mode, the power status of the multimedia bridge 410, the audio unit 416, and the user sensing device 304 are inactive, and the power status of the peripheral hub 208, and the position sensing device 302 are active. In the MFG test mode, the factory may need to test each function of the head mounted display apparatus 104. In the MFG test mode, the power status of the multimedia bridge 410, the audio unit 416, the position sensing device 302, and the user sensing device 304 are inactive or configured by the testing software used by the factory, and the power status of the peripheral hub 208 is active.

Figure 11A:
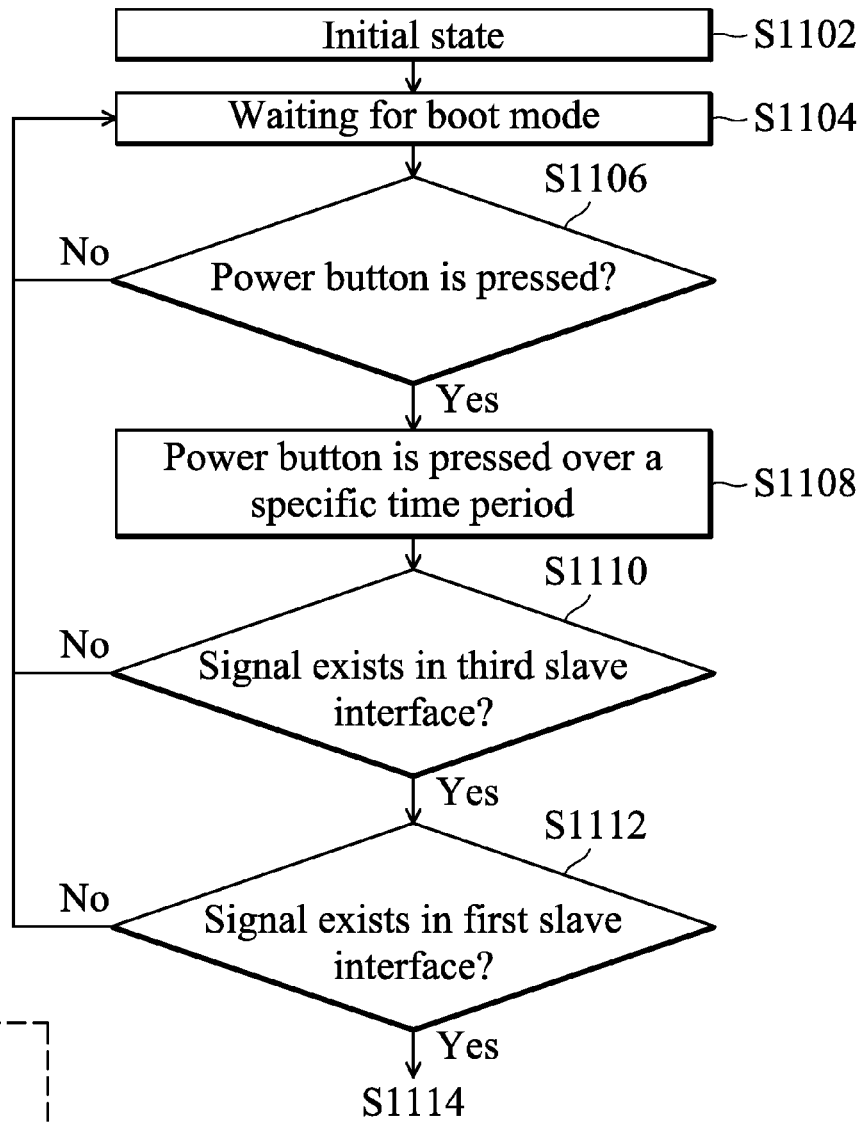
FIGS. 11A and 11B show a method for controlling operation modes of a head mounted display apparatus according to an embodiment of the invention.
Figure 11B:
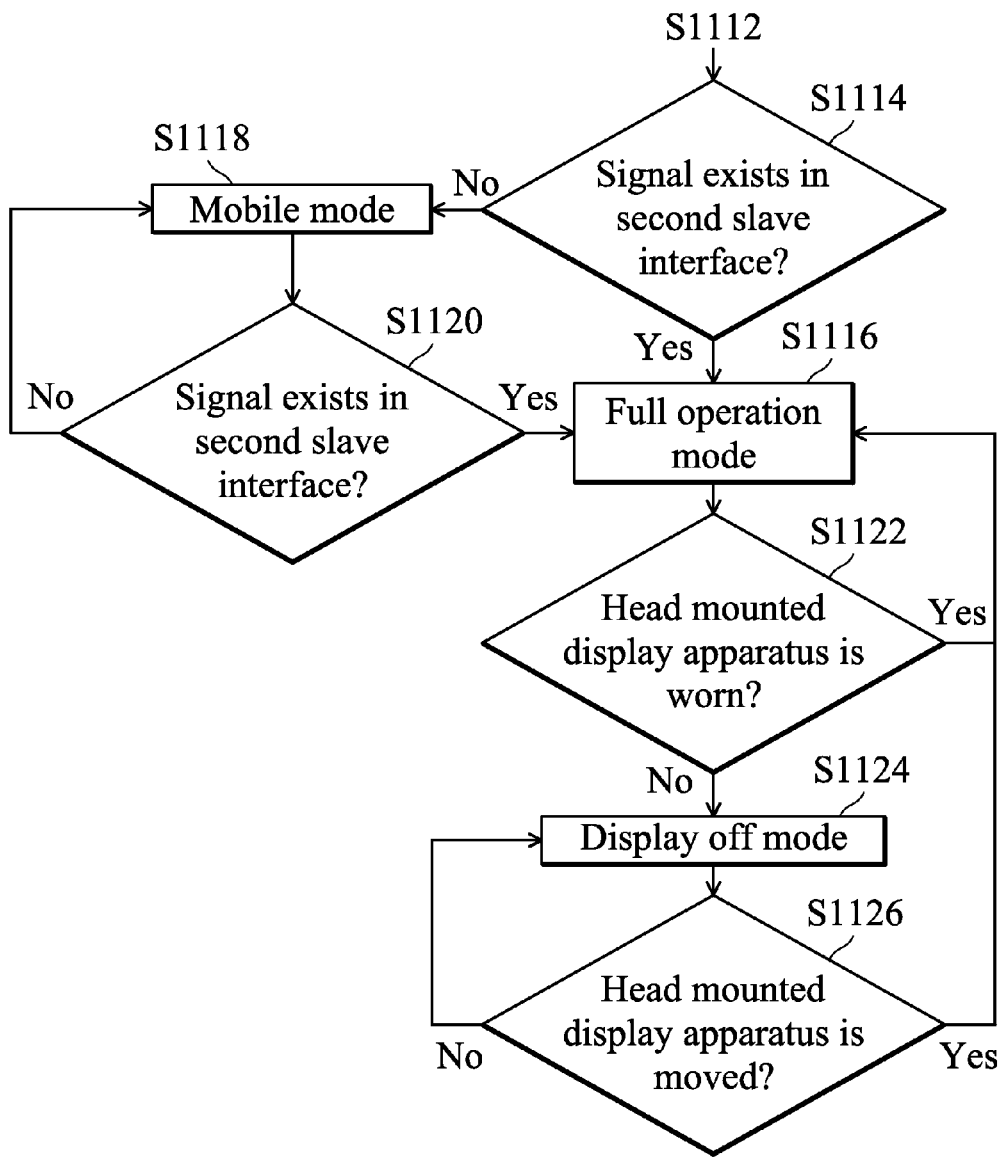

FIGS. 11A and 11B show a method for controlling operation modes of a head mounted display apparatus according to an embodiment of the invention. Referring to FIG. 1 and FIGS. 11A and 11B together, first, in an initial state (step S1102), the head mounted display apparatus 104 is turned off. If there are signals or voltages received by one of the first slave interface 30A, the second slave interface 30B, and the third slave interface 30C of the head mounted display apparatus 104, the head mounted display apparatus 104 will enter a "Waiting for boot" mode (step S1104), wherein the power status of the multimedia bridge 410, the peripheral hub 208, the audio unit 416, the position sensing device 302, and the user sensing device 304 are inactive. Next, the head mounted display apparatus 104 will detect whether the power button of the head mounted display apparatus 104 is pressed (step S1106). If the power button of the head mounted display apparatus 104 is pressed over a time period (step S1108), for example 1 sec, the head mounted display apparatus 104 will detect whether the third slave interface 30C has received the power voltage PWR (step S1110). If the power voltage PWR is detected, the head mounted display apparatus 104 will detect consequently whether the first slave interface 30A has received signals, e.g. the multimedia content CXT (step S1112). If no signal is detected in the first slave interface 30A, the head mounted display apparatus 104 will remain in the "Waiting for boot" mode. If it is detected that the first slave interface 30A has received the signals, the head mounted display apparatus 104 will detect whether the second slave interface 30B has received signals, e.g. the communication data DAT (step S1114). If it is detected that the second slave interface 30B has received the signals, the head mounted display apparatus 104 will enter the full operation mode (step S1116), wherein the power status of the multimedia bridge 410, the peripheral hub 208, the audio unit 416, the position sensing device 302, and the user sensing device 304 are active. If no signal is detected in the second slave interface 30B, the head mounted display apparatus will enter the mobile mode (step S1118), wherein the power status of the multimedia bridge 410 and the audio unit 416 are active, and the power status of the peripheral hub 208, the position sensing device 302, and the user sensing device 304 are inactive. During the mobile mode, if it is detected that the second slave interface 30B has received signals (step S1120), the head mounted display apparatus 104 will enter the full operation mode (step S1116). During the full operation mode, if it is detected that the user is not wearing the head mounted display apparatus 104 (step S1122), the virtual reality system will enter the display off mode (S1124) until it is detected that the head mounted display apparatus 104 is moved (step S1230). If the head mounted display apparatus 104 is moved, the virtual reality system will return back to the full operation mode (step S1126). As described above, in the display off mode, the power status of the multimedia bridge 410, the audio unit 416, and the user sensing device 304 are inactive, and the power status of the peripheral hub 208, and the position sensing device 302 are active. Thus, by controlling the power status of the circuits of the head mounted display apparatus 104 in the different modes, power consumption of the head mounted display apparatus 104 can be controlled.

Figure 12:
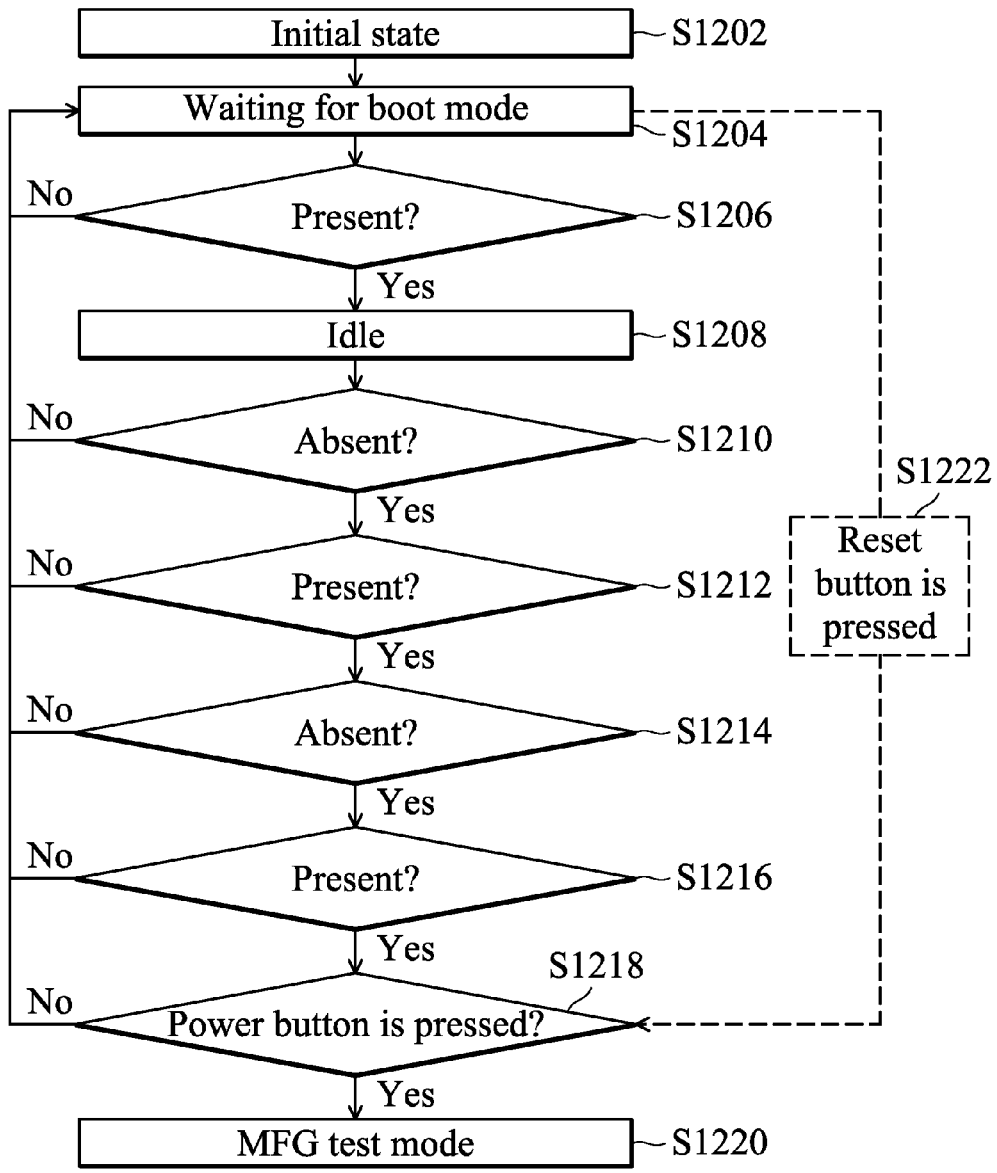
FIG. 12 shows a flow chart illustrating how the head mounted display apparatus 104 enter the MFG mode according to an embodiment of the invention.

FIG. 12 shows a flow chart illustrating how the head mounted display apparatus 104 enters the MFG mode according to an embodiment of the invention. In the embodiment, if the factory need the head mounted display apparatus to enter the MFG test mode, the factory will only need to connect and disconnect the second slave interface 30B in a predetermined sequence while not pressing the power button (as shown in the flow chart, denoted as "Present", "Idle", "Absent", "Present", "Absent", "Present", and then "Power button" consecutively), wherein "Present" (step S1206, step S1212, and step S1216) represents that the second slave interface 30B has received signals, and "Absent" (step S1210, and step S1214) represents that no signal has received in the second slave interface 30B. Furthermore, "Power button is pressed" represents the power button is pressed within a specific time, e.g. 4 sec (step S1218). In some situations, a reset button can be designed on the head mounted display apparatus 104. If the reset button is pressed (step S1222), and then the power button (step S1218) is pressed, the head mounted display apparatus 104 will directly enter the MFG mode (step S1220).

Figure 13:
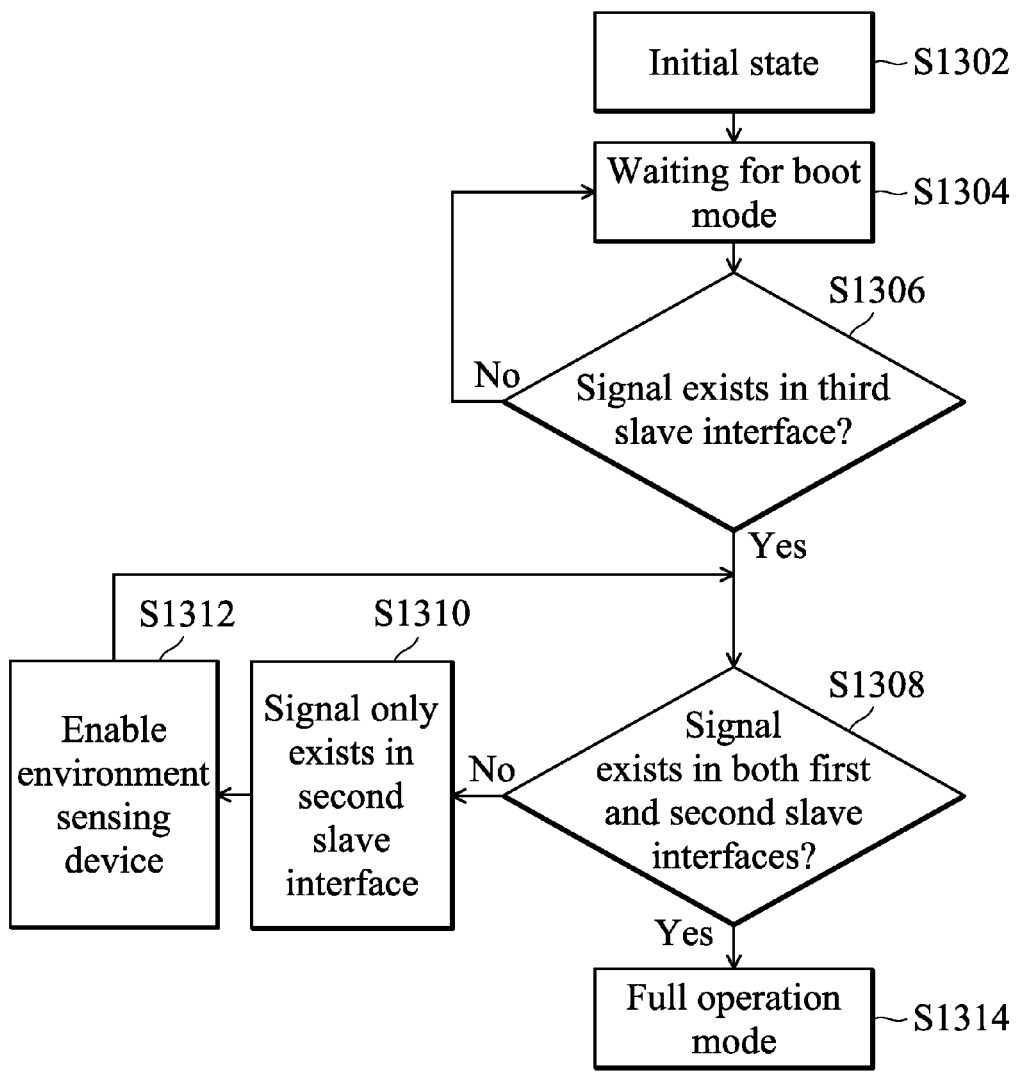
FIG. 13 shows a method for controlling operation modes of a head mounted display apparatus according to another embodiment of the invention.

FIG. 13 shows a method for controlling operation modes of a head mounted display apparatus according to another embodiment of the invention. Referring to FIG. 1 and FIG. 13 together, first, in an initial state (step S1302), the head mounted display apparatus 104 is turned off. If there are signals or voltages received by one of the first slave interface 30A, the second slave interface 30B, and the third slave interface 30C of the head mounted display apparatus 104, the head mounted display apparatus 104 will enter a "Waiting for boot" mode (step S1304), wherein the power status of the multimedia bridge 410, the peripheral hub 208, the audio unit 416, the position sensing device 302, and the user sensing device 304 are inactive. Next, the head mounted display apparatus 104 will detect whether the third slave interface 30C has received the power voltage PWR (step S1306). If no signal is detected in the third slave interface 30C, the head mounted display apparatus 104 will remain in the "Waiting for boot" mode (step S1304). If the power voltage PWR is detected in the third slave interface 30C, the head mounted display apparatus 104 will detect consequently whether both the first slave interface 30A and the second slave interface 30B have received signals (step S1308), e.g. the multimedia content CXT and the communication data DAT. If it is detected that only the second slave interface 30B has received the signals (S1310), the head mounted display apparatus 104 will enable the environment sensing device 306 of FIG. 3 (step S1312). After the environment sensing device 306 is enabled, the head mounted display apparatus 104 will continue to detect whether both the first slave interface 30A and the second slave interface 30B have received signals (step S1308). If it is detected that both the first slave interface 30A and the second slave interface 30B have received the signals, the head mounted display apparatus 104 will enter a full operation mode (step S1314), wherein the power status of the multimedia bridge 410, the peripheral hub 208, the audio unit 416, the position sensing device 302, and the user sensing device 304 are active. Thus, by controlling the power status of the circuits of the head mounted display apparatus 104 according to the signals exist in the first slave interface 30A and/or the second slave interface 30B, power consumption of the head mounted display apparatus 104 can be controlled. Furthermore, in this embodiment, no power button is implemented in the head mounted display apparatus 104.

Figure 14:
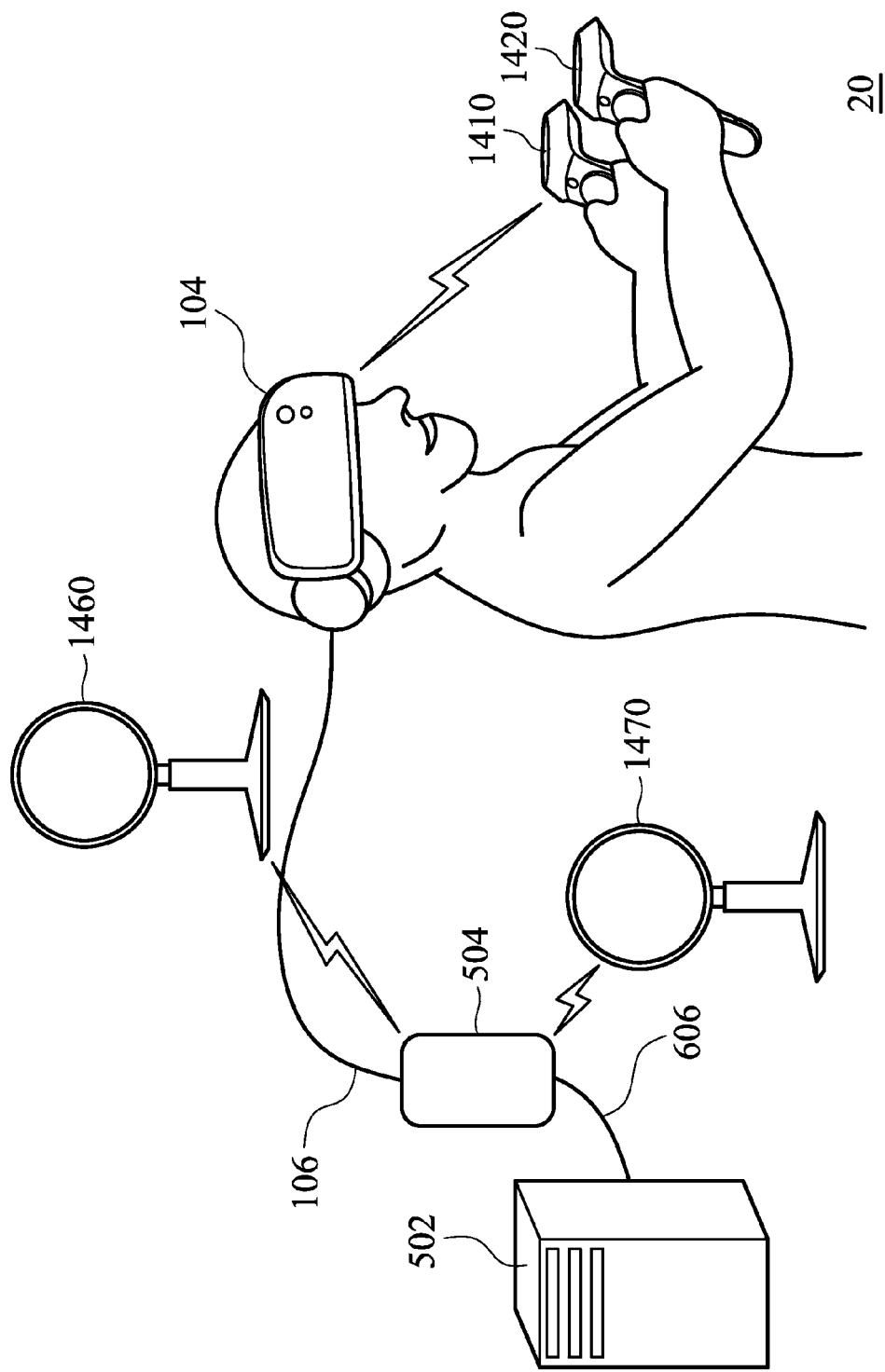
FIG. 14 shows an exemplary architecture of a virtual reality system according to another embodiment of the invention.

FIG. 14 shows an exemplary architecture of a virtual reality system 20 according to another embodiment of the invention. The virtual reality system 20 comprises a computing device 502, a connection control unit 504, a head mounted display apparatus 104, two controllers 1410 and 1420, and two base stations 1460 and 1470. In FIG. 14, the connection control unit 504 is connected to the computing device 502 through a pre-stage cable 606. The pre-stage cable 606 can transmit the multimedia content CXT, the communication data DAT, and the sensing information $INFO_S$ between the computing device 502 and the connection control unit 504, and it can transmit the power voltage PWR from the power source to the connection control unit 504. The connection control unit 504 is connected to the head mounted display apparatus 104 via the transmission cable 106. The transmission cable 106 can transmit the multimedia content CXT, the communication data DAT, the sensing information $INFO_S$, and/or the power voltage PWR between the connection control unit 504 and the head mounted display apparatus 104. In the embodiment, the user holds the controller 1410 with his left hand, and also holds the controller 1420 with his right land. The head mounted display apparatus 104 is capable of communicating with the controllers 1410 and 1420 via the wireless module 212 of FIG. 2, so as to perform a specific application, e.g. game. In the embodiment, the base stations 1460 and 1470 are the position reference devices. As described above, each position reference device can be located at a distance away from the head mounted display apparatus 104, so as to wirelessly provide reference information to a position sensing device (e.g. 302 of FIG. 3) of the head mounted display apparatus 104. Thus, the position sensing device can use the reference information from the base stations 1460 and 1470 to generate the position information $INFO_P$.

Figure 15:
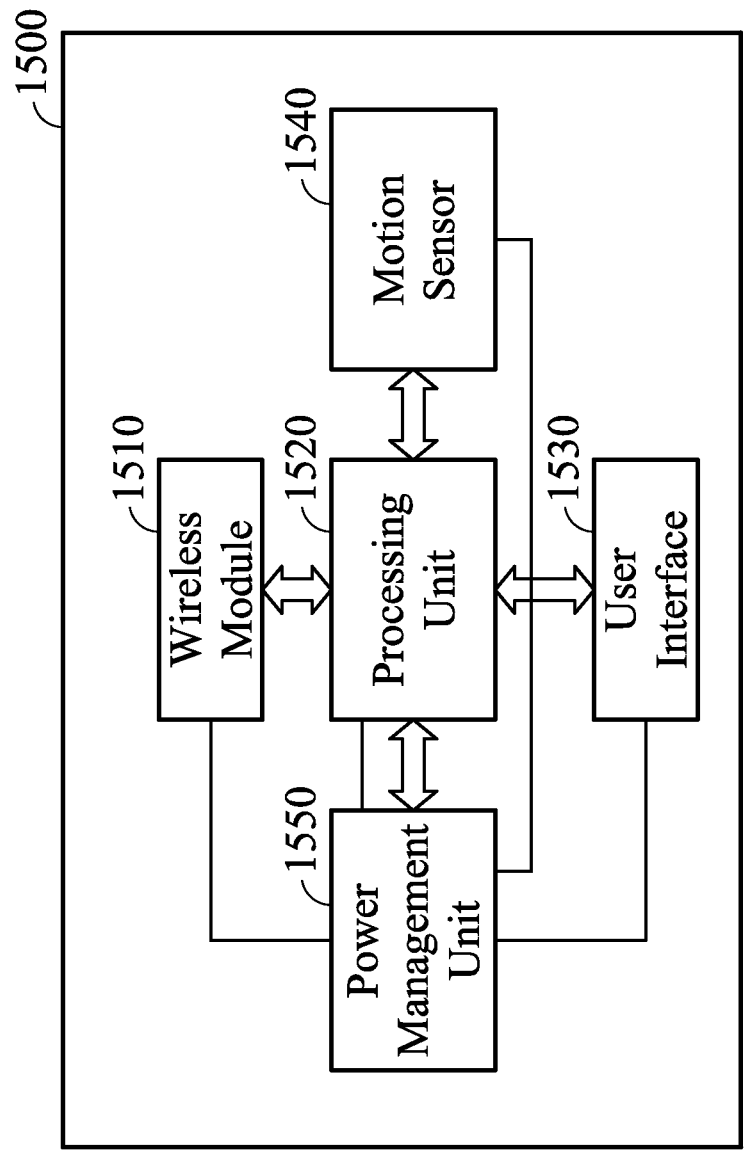
FIG. 15 shows a controller according to an embodiment of the invention.

FIG. 15 shows a controller 1500 according to an embodiment of the invention. The controller 1500 comprises a wireless module 1510, a processing unit 1520, a user interface 1530, a motion sensor 1540, and a power management unit (PMU) 1550. In the embodiment, the processing unit 1520 can communicate with the wireless module 1510, the user interface 1530, the motion sensor 1540, and the PMU 1550, so as to control the circuits and obtain data from the circuits. The wireless module 1510 is capable of communicating with a wireless module (e.g. 212 of FIG. 2) of the head mounted display apparatus 104. The user interface 1530 comprises a plurality of buttons. When one button is pressed, the processing unit 1520 can transmit the information corresponding to the pressed button to the head mounted display apparatus 104 via the wireless module 1510. The motion sensor 1540 is capable of detecting the motion of the controller 1500, and providing the motion information to the processing unit 1520. Similarly, the processing unit 1520 can transmit the motion information to the head mounted display apparatus 104 via the wireless module 1510. Furthermore, the PMU 1550 can provide the corresponding operating voltages to the wireless module 1510, the processing unit 1520, the user interface 1530, and the motion sensor 1540. Moreover, when the controller 1500 is coupled to a charger (not shown), a battery of the PMU 1550 is charged by the charger.

Figure 16:
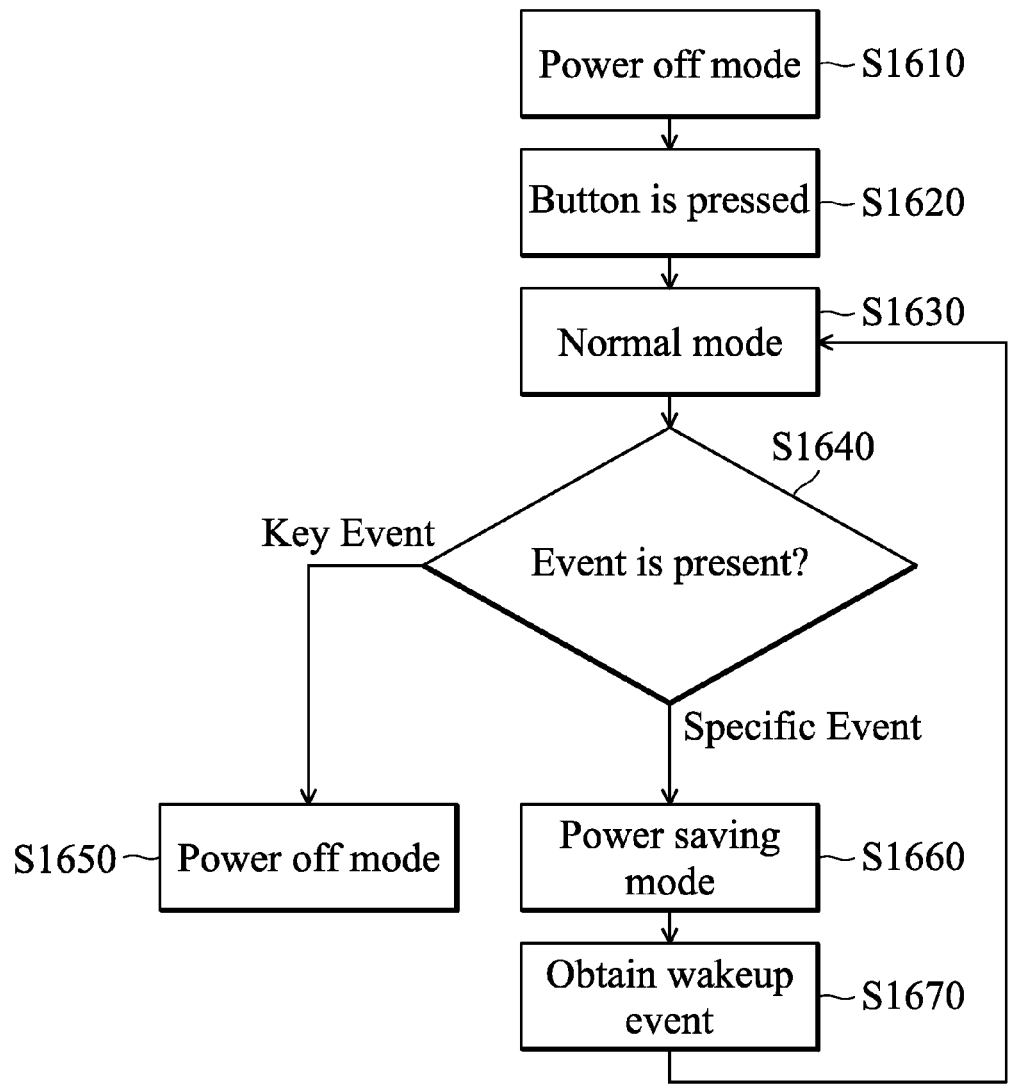
FIG. 16 shows a method for controlling operation modes of a controller according to an embodiment of the invention.

FIG. 16 shows a method for controlling operation modes of a controller according to an embodiment of the invention. Referring to FIG. 15 and FIG. 16 together, first, in a power off mode (step S1610), the controller 1500 is turned off, wherein the power status of the processing unit 1520, the wireless module 1510, and the motion sensor 1540 are inactive. If it is detected that any button of the user interface 1530 of the controller 1500 is pressed over a time period (step S1620), the controller 1500 will enter a normal mode (step S1630), wherein the power status of the processing unit 1520, the wireless module 1510, and the motion sensor 1540 are active. When the controller 1500 enters the normal mode, the processing unit 1520 will provide information corresponding to the key event, battery event, or charging event to the head mounted display apparatus 104 via the wireless module 1510. In some embodiments, when one button of the user interface 1530 is pressed, a key event is present. In some embodiments, when battery status of the battery of the PMU 1550 is changed, such as the battery capacity of the battery of the PMU 1550 is lower than or higher than a specific value, a battery event is present. Furthermore, when the controller 1500 is coupled to a charger, the battery of the PMU 1550 is charged and a charging event is present. When the controller 1500 is operating in the normal mode, the controller 1500 will continue to detect whether any event is present (S1640). If a key event indicating that a power button is pressed over a time period is detected, the controller 1500 will enter the power off mode (step S1650) after notifying the head mounted display apparatus 104 and receiving a response from the head mounted display apparatus 104 corresponding to the key event. As described above, the power status of the processing unit 1520, the wireless module 1510, and the motion sensor 1540 are inactive in the power off mode. Moreover, if a specific event is detected, the controller 1500 will enter a power saving mode (or called as a sleep mode) (step S1660). In some embodiments, the controller 1500 will notify the head mounted display apparatus 104 that the controller 1500 will enter the power saving mode. In one embodiment, the specific event is provided by the head mounted display apparatus 104, and the specific event indicates that the head mounted display apparatus 104 is operating in the display off mode, for example, the head mounted display apparatus 104 is not being worn by the user. In one embodiment, the operating voltages and/or frequency of the circuits of the controller 1500 are decreased in the power saving mode. In other embodiments, the specific event is present when the controller 1500 has not been moved over a time period or the controller 1500 is coupled to a charger. When the controller 1500 is operated in the power saving mode, the controller 1500 will continue to detect whether any event is present. If a wakeup event is obtained in the power saving mode (step S1670), the controller 1500 will enter the normal mode (step S1630) and notify the head mounted display apparatus 104. In some embodiment, the wakeup event is a wireless event provided by the head mounted display apparatus 104, wherein the wireless event indicates that the head mounted display apparatus 104 returns back to the normal mode from the display off mode. In some embodiments, the wakeup event is a motion event indicating that the controller 1500 is moved. In some embodiments, the wakeup event is a key event indicating that one button of the user interface 1530 has been pressed. In some embodiments, the wakeup event is a charging event indicating that charging of the battery of the PMU 1550 is completed or the controller 1500 is disconnected from the charger.

Figure 17:
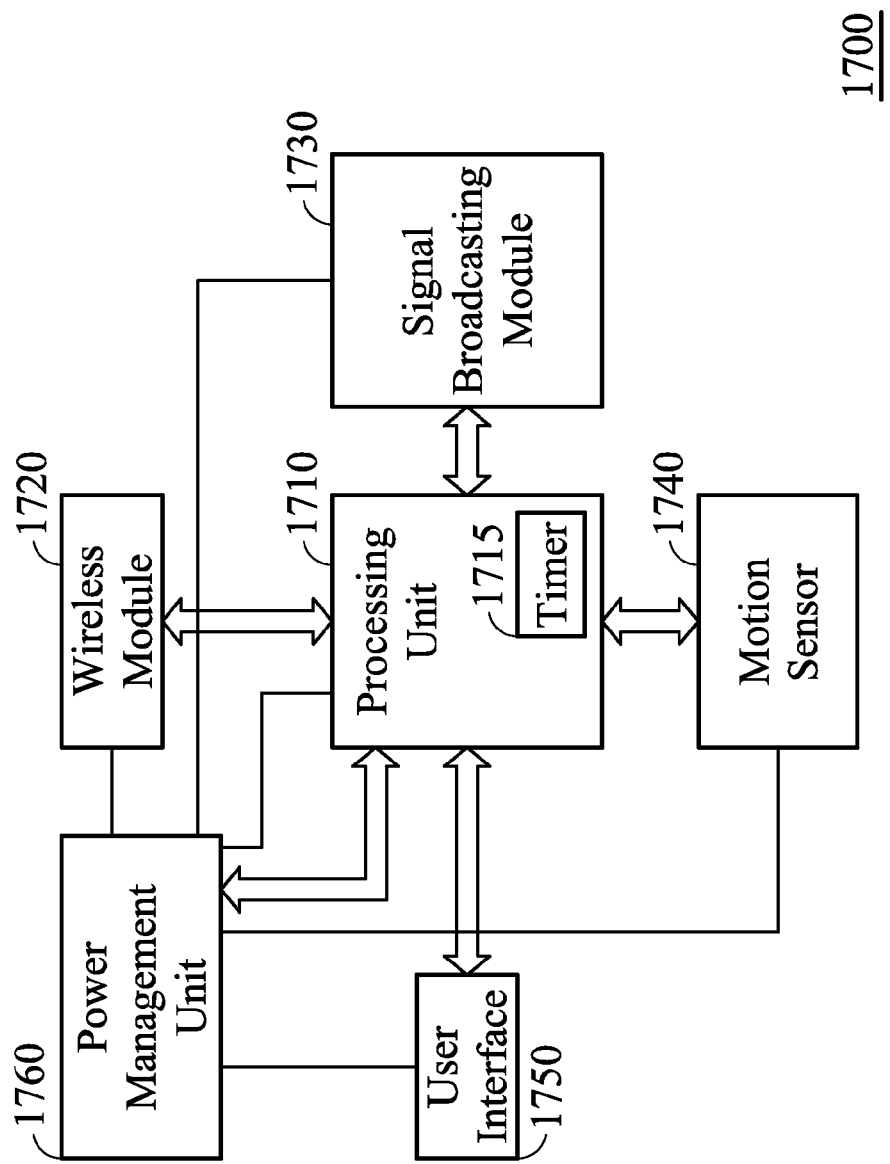
FIG. 17 shows a base station according to an embodiment of the invention.

FIG. 17 shows a base station 1700 according to an embodiment of the invention. The base station 1700 comprises a processing unit 1710, a wireless module 1720, a signal broadcasting module 1730, a motion sensor 1740, a user interface 1750, and a PMU 1760. In the embodiment, the processing unit 1710 can communicate with the wireless module 1720, the signal broadcasting module 1730, the motion sensor 1740, the user interface 1750, and the PMU 1760, so as to control the circuits and obtain data from the circuits. Furthermore, the PMU 1760 can provide the corresponding operating voltages to the processing unit 1710, the wireless module 1720, the signal broadcasting module 1730, the motion sensor 1740, and the user interface 1750. Referring to FIG. 17 and FIG. 14 together, in a normal mode, the wireless module 1720 (e.g. a Bluetooth transceiver) is capable of communicating with the connection control unit 504 of FIG. 14 via the Bluetooth transceiver of the connection control unit 504, e.g. the Bluetooth transceiver 702 of FIG. 7. Furthermore, the signal broadcasting module 1730 (including a laser) is capable of providing reference information to the head mounted display apparatus 104. For example, in a room, the base station 1700 can provide the reference information to the various head mounted display apparatuses in the room, respectively. Furthermore, when one head mounted display apparatus is being worn by the user, the connection control unit 504 of the worn head mounted display apparatus will periodically provide a trigger signal to keep the base station 1700 alive in every specific period, e.g. 10 minutes. In response to the trigger signal received by the wireless module 1720, the processing unit 1710 resets/enables a timer 1715 to count time. If a specific time period (e.g. 30 minutes) is counted by the timer 1715 and no trigger signal is received by the wireless module 1720 during the specific time period, the base station 1700 will enter a power off mode. Furthermore, the base station 1700 will enter the normal mode from the power off mode when a power button of the user interface 1750 is pressed over a time period. In some embodiments, the user interface 1750 further comprises an indicator capable of indicating whether the base station 1700 is operating in the normal mode. For example, the indicator is a light emitting diode (LED) device, and when the base station 1700 is operating in the normal mode, the LED device is turned on by the processing unit 1710. To the contrary, when the base station 1700 is operating in the power off mode, the LED device is turned off. Moreover, the motion sensor 1740 is capable of detecting the motion of the base station 1700, and providing the motion information to the processing unit 1710. When the motion information indicates that the base station 1700 is moved, the processing unit 1710 can transmit an alarm signal to the head mounted display apparatus 104 via the wireless module 1720.

Figure 18:
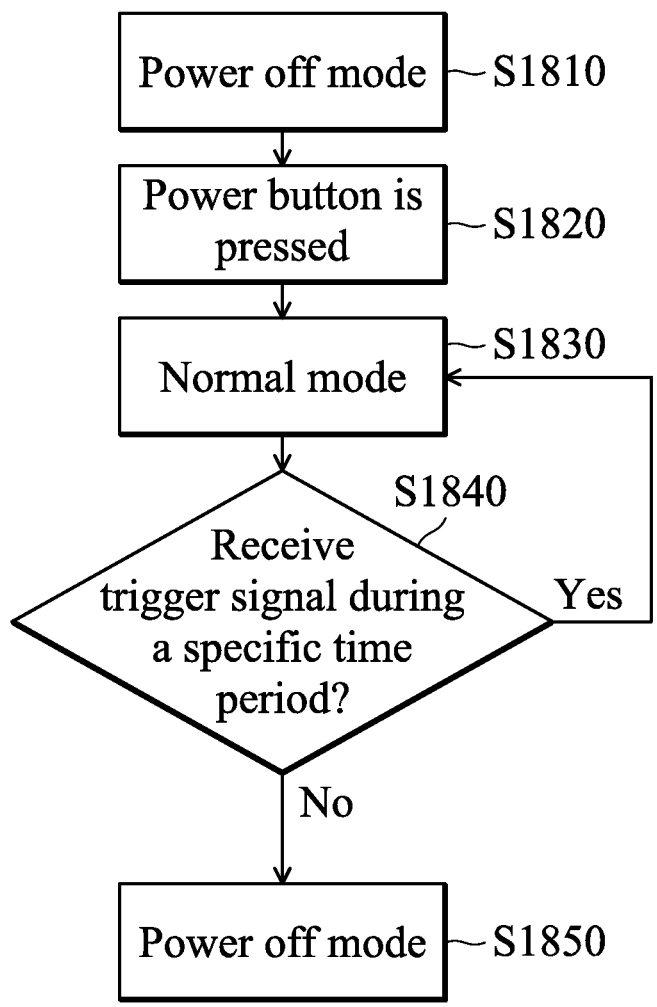
FIG. 18 shows a method for controlling operation modes of a base station according to an embodiment of the invention.

FIG. 18 shows a method for controlling operation modes of a base station according to an embodiment of the invention. Referring to FIG. 17 and FIG. 18 together, first, in a power off mode (step S1810), the base station 1700 is disabled. If it is detected that a power button of the base station 1700 is pressed over a time period (step S1820), the base station 1700 will enter a normal mode (step S1830), and then the timer 1715 is enabled to count time. Before a specific time period is counted by the timer 1715, it is detected whether a trigger signal from a connection control unit of a head mounted display apparatus is received by the wireless module 1720 in the normal mode (step S1840). If no trigger signal is received by the wireless module 1720 during the specific time period, the base station 1700 will enter a power off mode (step S1850). To the contrary, if any trigger signal is received during the specific time period, the base station 1700 will continue to operate in the normal mode (step S1830). Simultaneously, in response to the trigger signal, the timer 1715 of the base station 1700 is reset to count the specific time period again.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A virtual reality system, comprising:
    a host device;
    a transmission cable;
    a head mounted display apparatus to be worn by a user and coupled to the host device via the transmission cable, comprising:
        a multimedia module, receiving multimedia content from the host device via a first signal path of the transmission cable;
        a multi-sensing module, obtaining sensing information regarding the head mounted display apparatus and the user;
        a peripheral hub, receiving communication data from the host device via a second signal path of the transmission cable, and providing the sensing information to the host device via the second signal path of the transmission cable;
        a power management device, controlling power status of the multimedia module, the multi-sensing module, and the peripheral hub according to a power voltage from the host device via a third signal path of the transmission cable; and
        a micro control unit, detecting in which mode the virtual reality system is operating according to signal status of the first and second signal paths of the transmission cable, so as to notify the power management device to control the power status of the multimedia module, the multi-sensing module, and the peripheral hub;
    a connection control unit coupled between the host device and the transmission cable, enhancing signal strength of the communication data and the sensing information; and
    a base station, comprising:
        a signal broadcasting module, providing reference information to the head mounted display apparatus;
        a first Bluetooth transceiver, communicating with a second Bluetooth transceiver of the connection control unit, and providing position information to the head mounted display apparatus via the connection control unit; and
        a timer,
        wherein in response to a trigger signal from the second Bluetooth transceiver of the connection control unit, the timer is reset to count time.

2. The virtual reality system as claimed in claim 1, wherein when the micro control unit detects that no signal exists in the second signal path of the transmission cable, the micro control unit notifies the power management device that the virtual reality system is operating in a mobile mode.

3. The virtual reality system as claimed in claim 2, wherein when the virtual reality system is operating in the mobile mode, the power status of the multimedia module is active, and the power status of the multi-sensing module and the peripheral hub are inactive.

4. The virtual reality system as claimed in claim 1, wherein the multimedia module comprises:
    a display section, displaying a video part of the multimedia content;
    an audio unit, delivering an audio part of the multimedia content or recording sound from the user; and
    a multimedia bridge coupled to the first signal path of the transmission cable, providing the multimedia content from the first signal path of the transmission cable to the display section and the audio unit, and providing the recorded sound from the audio unit to the first signal path of the transmission cable.

5. The virtual reality system as claimed in claim 1, wherein when the micro control unit detects that a first signal exists in the first signal path of the transmission cable and a second signal exists in the second signal path of the transmission cable, the micro control unit notifies the power management device that the virtual reality system is operating in a full operation mode.

6. The virtual reality system as claimed in claim 5, wherein when the virtual reality system is operating in the full operation mode, the power status of the multimedia module, the multi-sensing module, and the peripheral hub are active.

7. The virtual reality system as claimed in claim 1, wherein the micro control unit further detects the type of operation mode in which the virtual reality system is operating according to the sensing information.

8. The virtual reality system as claimed in claim 7, wherein when the sensing information indicates that the head mounted display apparatus is not being worn by the user, the micro control unit notifies the power management device that the virtual reality system is operating in a display off mode.

9. The virtual reality system as claimed in claim 8, wherein when the virtual reality system is operating in the display off mode, the power status of the multimedia module is inactive, and the power status of the peripheral hub is active.

10. The virtual reality system as claimed in claim 1, wherein the multi-sensing module comprises:
    a position sensing device, obtaining position information corresponding to the head mounted display apparatus;
    a user sensing device, obtaining user information of the user; and
    an environment sensing device, obtaining environment information,
    wherein the multi-sensing module obtains the sensing information according to the position information, the user information, and the environment information.

11. The virtual reality system as claimed in claim 10, wherein when the micro control unit detects that a first signal exists in the first signal path of the transmission cable and a second signal exists in the second signal path of the transmission cable, the position sensing device, the user sensing device and the environment sensing device are active.

12. The virtual reality system as claimed in claim 11, wherein when the position information corresponding to the head mounted display apparatus indicates that the head mounted display apparatus is not being worn by the user and the first and second signals exist, the position sensing device is active, and the user sensing device and the environment sensing device are inactive.

13. The virtual reality system as claimed in claim 10, wherein the position information comprises movement information, orientation information, tilt angle information, and/or location information of the head mounted display apparatus, the user information comprises biometrical information about the user and/or an eye view information, and the environment information comprises images/video and/or depth information captured by the environment sensing device.

14. The virtual reality system as claimed in claim 10, wherein the host device comprises:
a computing device, generating the multimedia content according to a multimedia source and the sensing information, and generating the communication data according to the sensing information; and
a connection control unit coupled between the computing device and the transmission cable, enhancing signal strength of the communication data and the sensing information.

15. The virtual reality system as claimed in claim 14, further comprising:
a power source coupled to the connection control unit, providing the power voltage to the third signal path of the transmission cable via the connection control unit.

16. The virtual reality system as claimed in claim 14, wherein the multimedia source is obtained from a storage unit of the computing device or Internet network.

17. The virtual reality system as claimed in claim 14, wherein the connection control unit further comprises:
a Bluetooth transceiver, communicating with a mobile phone,
wherein when an event from the mobile phone is received via the Bluetooth transceiver, the computing device provides the multimedia content in response to the event.

18. The virtual reality system as claimed in claim 1, further comprising:
a controller, comprising:
a first wireless module, communicating with a second wireless module of the head mounted display apparatus;
a motion sensor, sensing a motion of the controller, and providing information regarding the motion of the controller to the head mounted display apparatus via the first wireless module;
a user interface, comprising at least a button, and providing information regarding the button to the head mounted display apparatus via the first wireless module; and
a battery,
wherein when the head mounted display apparatus notifies the controller that the head mounted display apparatus is not being worn by the user, the controller is operating in a power saving mode.

19. The virtual reality system as claimed in claim 18, wherein when the battery is charged by a charger coupled to the controller or the information regarding the motion of the controller indicates that the controlled has not been moved over a specific time period, the controller is operating in the power saving mode.

20. The virtual reality system as claimed in claim 18, wherein when the button is pressed over a specific time period, the first wireless module, and the motion sensor are inactive after the controller provides a key event corresponding to the pressed button and receives a response from the head mounted display apparatus corresponding to the key event.

21. The virtual reality system as claimed in claim 19, wherein when the controller obtains a wakeup event, the controller enters a normal mode from the power saving mode, so as to provide the information regarding the motion of the controller, the information regarding the button or a status of the battery to the head mounted display apparatus.

22. The virtual reality system as claimed in claim 21, wherein the wakeup event is present when the head mounted display apparatus is being worn by the user, the information regarding the motion of the controller indicates that the controlled has been moved, the button has been pressed, or the controller is disconnected from the charger.

23. The virtual reality system as claimed in claim 1, wherein the connection control unit periodically provides the trigger signal to the base station when the head mounted display apparatus is being worn by the user.

24. The virtual reality system as claimed in claim 1, wherein when a specific time period is counted by the timer and no trigger signal is provided from the connection control unit, the controller is powered off.

25. A method for controlling operation modes of a virtual reality system, wherein the virtual reality system comprises a host device, a head mounted display apparatus to be worn by a user, and a transmission cable coupled between the host device and the head mounted display apparatus, the method comprising:
detecting whether multimedia content exists in a first signal path of the transmission cable when a power voltage from the host device is received, by the head mounted display apparatus;
detecting whether communication data or sensing information exists in a second signal path of the transmission cable when the multimedia content is received, by the head mounted display apparatus;
controlling the head mounted display apparatus to operate in a full operation mode when the multimedia content exists in the first signal path of the transmission cable and the communication data or sensing information exists in the second signal path of the transmission cable, by the head mounted display apparatus;
controlling the head mounted display apparatus to operate in a mobile mode when the multimedia content exists in the first signal path of the transmission cable and the communication data or sensing information does not exist in the second signal path of the transmission cable, by the head mounted display apparatus;
enhancing signal strength of the communication data and the sensing information, by a connection control unit coupled between the host device and the transmission cable; and
communicating with a Bluetooth transceiver of the connection control unit and providing position information to the head mounted display apparatus via the connection control unit, by a base station;

wherein in response to a trigger signal from the Bluetooth transceiver of the connection control unit, a timer of the base station is reset to count time, and wherein the first signal path is separated from the second signal path in the transmission cable.

26. The method as claimed in claim 25, wherein the head mounted display apparatus comprises:
   a multimedia module, receiving the multimedia content from the host device via the first signal path of the transmission cable, and;
   a multi-sensing module, obtaining sensing information regarding the head mounted display apparatus and the user;
   a peripheral hub, receiving the communication data from the host device via the second signal path of the transmission cable, and providing the sensing information to the host device via the second signal path of the transmission cable;
   a power management device, controlling power status of the multimedia module, the multi-sensing module, and the peripheral hub according to a power voltage from the host device via a third signal path of the transmission cable; and
   a micro control unit, detecting in which mode the virtual reality system is operating according to the signal status of the first and second signal paths of the transmission cable, so as to notify the power management device to control the power status of the multimedia module, the multi-sensing module, and the peripheral hub.

27. The method as claimed in claim 26, wherein when the virtual reality system is operating in the mobile mode, the power status of the multimedia module is active, and the power status of the multi-sensing module and the peripheral hub are inactive.

28. The method as claimed in claim 26, wherein the multimedia module comprises:
   a display section, displaying a video part of the multimedia content;
   an audio unit, delivering an audio part of the multimedia content or recording sound from the user; and
   a multimedia bridge coupled to the first signal path of the transmission cable, providing the multimedia content from the first signal path of the transmission cable to the display section and the audio unit, and providing the recorded sound from the audio unit to the first signal path of the transmission cable.

29. The method as claimed in claim 26, wherein when the virtual reality system is operating in the full operation mode, the power status of the multimedia module, the multi-sensing module, and the peripheral hub are active.

30. The method as claimed in claim 26, wherein the micro control unit further detects the type of operation mode in which the virtual reality system is operating according to the sensing information.

31. The method as claimed in claim 30, further comprising:
   controlling the head mounted display apparatus to operate in a display off mode when the sensing information indicates that the head mounted display apparatus is not being worn by the user.

32. The method as claimed in claim 31, wherein when the virtual reality system is operating in the display off mode, the power status of the multimedia module is inactive, and the power status of the peripheral hub are active.

* * * * *